United States Patent
Hatakeyama

(10) Patent No.: US 8,514,304 B2
(45) Date of Patent: Aug. 20, 2013

(54) IMAGE PROCESSING DEVICE AND IMAGE PICKUP DEVICE USING THE SAME

(75) Inventor: Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/204,453

(22) Filed: Aug. 5, 2011

(65) Prior Publication Data

US 2011/0285879 A1 Nov. 24, 2011

Related U.S. Application Data

(63) Continuation of application No. PCT/JP2011/055610, filed on Mar. 10, 2011.

(30) Foreign Application Priority Data

Mar. 31, 2010 (JP) ................................. 2010-082832
Mar. 31, 2010 (WO) .................. PCT/JP2010/055865

(51) Int. Cl.
*H04N 5/217* (2011.01)
*H04N 5/225* (2006.01)
*H04N 5/262* (2006.01)
*H04N 5/228* (2006.01)
*G06K 9/00* (2006.01)
*G06K 9/40* (2006.01)

(52) U.S. Cl.
USPC ........ 348/241; 348/335; 348/340; 348/222.1; 348/240.99; 382/167; 382/260; 382/265; 382/274; 382/275

(58) Field of Classification Search
USPC ................. 348/335, 340, 241, 222.1, 240.99, 348/240.3; 382/167, 254, 260–265, 274, 382/275
See application file for complete search history.

(56) References Cited

U.S. PATENT DOCUMENTS

| | | | |
|---|---|---|---|
| 2007/0146689 A1* | 6/2007 | Araki et al. | 356/124.5 |
| 2008/0101712 A1* | 5/2008 | Wang | 382/254 |
| 2009/0128655 A1* | 5/2009 | Yoneyama | 348/222.1 |
| 2011/0254947 A1* | 10/2011 | Kasahara | 348/135 |

FOREIGN PATENT DOCUMENTS

| | | |
|---|---|---|
| JP | 2003-078812 A | 3/2003 |
| JP | 2007-036799 A | 2/2007 |
| JP | 2007-183842 A | 7/2007 |
| JP | 2009-021905 A | 1/2009 |
| JP | 2009-271725 A | 11/2009 |
| JP | 2009-289079 A | 12/2009 |

* cited by examiner

*Primary Examiner* — Nhan T Tran
*Assistant Examiner* — Xi Wang
(74) *Attorney, Agent, or Firm* — Canon U.S.A., Inc. IP Division

(57) ABSTRACT

An image processing device capable of obtaining a high precision image while aberration asymmetry is corrected. An image processing device includes image obtaining means configured to obtain an input image, image restoration means configured to restore the input image using a generated or selected image restoration filter in accordance with a transfer function of an image pickup system used for forming the input image from an object image. The image restoration filter makes a difference between absolute values of transfer functions of two azimuthal directions at a time when the restoration image is obtained from an object smaller than a difference between absolute values of transfer functions of the two azimuthal directions of the image pickup system.

19 Claims, 23 Drawing Sheets

IMAGE RESTORATION FILTER

VALUE OF TAP

TAP

FIG. 9

| NO-OPERATION FILTER | | | | DIFFERENTIAL FILTER | | | | EDGE EMPHASIS FILTER | | |
|---|---|---|---|---|---|---|---|---|---|---|
| 0 | 0 | 0 | | 0 | 1 | 0 | | 0 | −1 | 0 |
| 0 | 1 | 0 | − | 1 | −4 | 1 | = | −1 | 5 | −1 |
| 0 | 0 | 0 | | 0 | 1 | 0 | | 0 | −1 | 0 |

IMAGE PROCESSING DEVICE AND IMAGE PICKUP DEVICE USING THE SAME

CROSS-REFERENCE TO RELATED APPLICATIONS

This application is a Continuation of International Patent Application No. PCT/JP2011/055610, filed Mar. 10, 2011, which claims the benefit of International Patent Application No. PCT/JP2010/055865, filed Mar. 31, 2010 and Japanese Patent Application No. 2010-082832, filed Mar. 31, 2010, all of which are hereby incorporated by reference herein in their entirety.

TECHNICAL FIELD

The present invention relates to image processing devices which perform image processing and particularly relates to an image processing device which performs image restoration.

BACKGROUND ART

Images obtained by image pickup devices such as digital still cameras are deteriorated due to image blurs. The blurs of images are caused by a spherical aberration, a comatic aberration, field curvature, astigmatism, and the like. These aberrations may be represented by a PSF (Point Spread Function). An OTF (Optic Transfer Function) obtained by performing Fourier transform on the point spread function (hereinafter referred to as a "PSF") is information on an aberration in a frequency space and is represented by a complex number. An absolute value of the optic transfer function (hereinafter referred to as an "OTF"), that is, an amplitude component is referred to as an MTF (Modulation Transfer Function), and a phase component is referred to as a PTF (Phase Transfer Function). An OTF of an image pickup optical system affects (deteriorates) an amplitude component and a phase component of an image. Therefore, in the image deteriorated by the influence of the OTF (hereinafter referred to as a "deteriorated image"), points of an object blur in an asymmetrical manner like a comatic aberration.

This case will be described with reference to FIGS. 23A to 23C. FIGS. 23A to 23C are diagrams schematically illustrating spread of the point spread function (PSF) in a plane which orthogonally intersects with a main light beam (which passes pupil of an optical system). In the plane shown in FIGS. 23A to 23C, lines which pass an optical axis and which orthogonally intersect with each other are determined as axes x1 and x2, and an angle θ defined by an arbitrary line which passes the optical axis and the axis x1 is determined as an azimuthal angle. Furthermore, when an origin of a coordinate axis of FIGS. 23A to 23C is determined as an image forming position of the main light beam, a direction represented by the azimuthal angle θ is determined as an azimuthal direction. The azimuthal direction includes a sagittal direction and a meridional direction and is an inclusive term of all directions including the angle θ direction.

As described above, the deterioration of the phase component (PTF) causes asymmetry in the PSF. Furthermore, the deterioration of the amplitude component (MTF) affects a degree of spread of the PSF for each azimuthal direction. FIG. 23A is a diagram schematically illustrating the PSF in which the comatic aberration is generated. When an optical system includes an optical axis which does not slant and a lens which has a rotation symmetry shape, a PSF in a field angle except for the optical axis is symmetric relative to a line which passes the optical axis and the main light beam, and therefore, the PSF has a line-symmetric shape. In FIG. 23A, the PSF is line symmetric relative to the axis x2.

FIG. 23B shows a PSF in a state in which a phase shift has not occurred. The PSF has a symmetry shape relative to the individual azimuthal directions. However, since amplitudes (MTFs) are different from each other, spreads of the PSF in the axes x1 and x2 directions are different from each other, that is, an asymmetry PSF is obtained. Note that the PSF on the optical axis does not have a phase shift when a manufacturing error is not taken into consideration and does not have azimuthal dependence of amplitude deterioration, and accordingly, a rotation-symmetry shape is obtained as shown in FIG. 23C. Specifically, as shown in FIGS. 23A and 23B, the PSF forms an asymmetric shape due to shifts of phases (PTFs) in the individual azimuthal directions and a difference between amplitudes (MTFs) of the azimuthal directions, and the asymmetric shape causes an image blur which prevents an image from being generated with high accuracy.

As a technique of correcting an image blur, in Patent Literature 1, a parameter α used to design an image restoration filter is determined as shown in Expression 1. By adjusting the adjusting parameter α, the image restoration filter which does not act (α=0) is changed to an inverse filter (α=1). Therefore, a degree of image restoration may be adjusted only using a single parameter within a range from an original captured image to an image which has been restored at maximum.

$$F(u, v) = \frac{\alpha H(u, v) * + 1 - \alpha}{\alpha |H(u, v)|^2 + 1 - \alpha} \times G(u, v) \quad \text{(Expression 1)}$$

Here, F(u, v) and G(u, v) represent a restoration image and a deteriorated image which have been subjected to Fourier transform, respectively.

Furthermore, as a filter which corrects an image blur so as to improve sharpness, a Wiener filter is known. A frequency characteristic M(u, v) of the Wiener filter is represented by Expression 2.

$$M(u, v) = \frac{1}{H(u, v)} \frac{|H(u, v)|^2}{|H(u, v)|^2 + SNR^2} \quad \text{(Expression 2)}$$

Here, H(u, v) denotes an optic transfer function (OTF). |H(u, v)| denotes an absolute value (MTF) of the OTF. SNR denotes an intensity ratio of a noise signal. Hereinafter, a process of restoring an image using the Wiener filter or the image restoration filter which is based on an optic transfer function (OTF) as disclosed in Patent Literature 1 is referred to as an image restoration process.

Citation List

Patent Literature

PTL 1 Japanese Patent Laid-Open No. 2007-183842

SUMMARY OF INVENTION

However, when the Wiener filter or the image restoration filter disclosed in Patent Literature 1 is used, deterioration of amplitude components and phase components in an image pickup optical system may be corrected but a difference between amplitude components in azimuthal directions may not be corrected. When the Wiener filter is used and when the MTFs obtained before restoration are different from each other depending on the azimuthal directions, the difference between the MTFs obtained before restoration in the azimuthal directions becomes large. This case will be described with reference to FIG. 20.

FIG. 20 is a diagram illustrating MTFs obtained before the image restoration process is performed and MTFs obtained after the image restoration process is performed using the Wiener filter. A dashed line (a) and a solid line (b) represent an MTF of a first azimuthal direction and an MTF of a second azimuthal direction before restoration, respectively. A dashed line (c) and a solid line (d) represent an MTF of the first azimuthal direction and an MTF of the second azimuthal direction after restoration, respectively. The first and second azimuthal directions correspond to a sagittal direction and a meridional direction, respectively, for example. In the Wiener filter, when an MTF is high, a low restoration gain (a low restoration degree) is attained whereas when an MTF is low, a high restoration gain (a high restoration degree) is attained. Accordingly, a restoration gain of the dashed line (a) which extends in the azimuthal direction and which corresponds to a low MTF is lower than that of the solid line (b) which extends in the azimuthal direction and which corresponds to a high MTF. Therefore, a difference between the MTF (c) in the first azimuthal direction obtained after restoration and the MTF(d) in the second azimuthal direction obtained after restoration is larger than a difference between the MTF (a) in the first azimuthal direction obtained before restoration and the MTF(b) in the second azimuthal direction obtained before restoration. That is, even when the image restoration process is performed, an asymmetry aberration is included in an image. This similarly occurs when the image restoration filter disclosed in Patent Literature 1 is used.

The present invention has been made in view of the above problem, and an object of the present invention is to provide an image processing device which reduces an asymmetry aberration which is likely to occur due to an image restoration process so as to obtain a higher-accuracy image.

To address the problems described above, according to a present invention, there is provided an image processing device including image obtaining means configured to obtain an input image, and image restoration means configured to restore the input image using a generated or selected image restoration filter in accordance with a transfer function of an image pickup system used to form the input image from an object image, wherein the image restoration filter makes a difference between absolute values of transfer functions in two azimuthal directions obtained when the restoration image is obtained from an object smaller than a difference between absolute values of transfer functions of the two azimuthal directions of the image pickup system.

Further features of the present invention will become apparent from the following description of exemplary embodiments with reference to the attached drawings.

BRIEF DESCRIPTION OF DRAWINGS

FIG. 9 is a diagram illustrating an edge emphasis filter.

DESCRIPTION OF EMBODIMENTS

First, a flow of an image process according to the present invention will be described with reference to FIG. 1.

Figure 1:
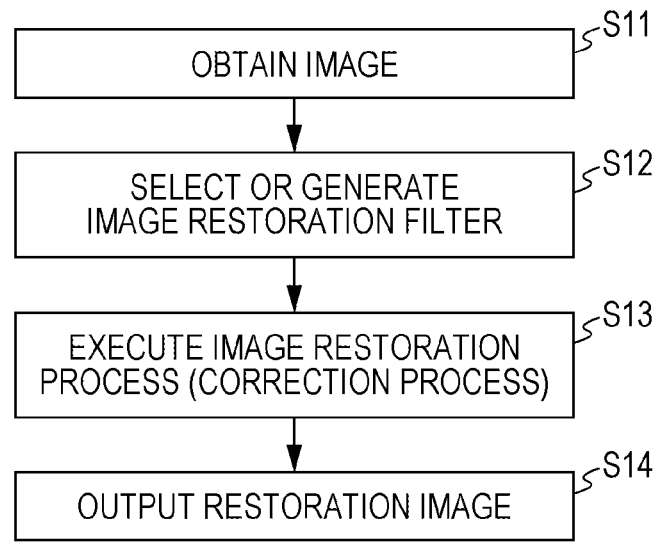
FIG. 1 is a flowchart illustrating an entire image process according to an embodiment of the present invention.

FIG. 1 shows operations of the processing operation from input of an image to output of the image. First, in an image obtaining operation in step S11, an image generated by an image pickup system is obtained. Hereinafter, the image obtained in the image obtaining operation is referred to as an input image.

Next, in step S12, an image restoration filter corresponding to a condition in which the input image obtained in step S11 is captured is generated. Note that, in step S12, an appropriate filter may be selected from among a plurality of image restoration filters provided in advance or a certain filter may be selected and thereafter the selected filter may be corrected where appropriate. In a step of an image restoration processing operation in step S13, the image restoration process (correction process) is executed using the image restoration filter which is generated in accordance with a transfer function of the image pickup system (optic transfer function of an image pickup optical system) or which is selected in step S12. More specifically, phase component (PTF) of the input image are corrected using zero as a target value and amplitude components (MTF) in two azimuthal directions are corrected so that a difference between the amplitude components is reduced. Then, in step S14, a corrected image which has been corrected in step S13 is output as an output image.

Note that after performing the operations in FIG. 1 or in the course of the operations, an operation for another image process may be inserted. Examples of another image process include electronic aberration correction such as distortion aberration correction and peripheral brightness correction, demosaicing, gamma conversion, and image compression. Next, the operations shown in FIG. 1 will be described in detail.

Note that, although the MTF represents an amplitude component (absolute value) of a transfer function (an optic transfer function of an image pickup optical system) of an image pickup system, the MTF may be used as a spectrum of an image when an object (an object included in an object field) is white point light source.

Image Obtaining Operation

An image obtained in the image obtaining operation (hereinafter referred to as an input image) is a digital image obtained by image capturing using an image pickup element through an image pickup optical system. The digital image obtained here is deteriorated when compared with an object included in an object field due to an optic transfer function (OTF) based on an aberration and the like of the image pickup optical system (lens) and an image pickup optical system including various optical filters. The optic transfer function (OTF) is preferably a transfer function based on the aberration of the optical element of the image pickup optical system or characteristics of other image pickup devices. As the image pickup optical system, a mirror (reflection surface) having a curvature may be used in addition to the lens.

Furthermore, the input image is represented by a color space. The color space is represented by RGB, for example, in addition to lightness, hue, and saturation which are represented by LCH and luminance and color-difference signals represented by YCbCr. Examples of other color spaces include XYZ, Lab, Yuv, JCh, and color temperature. A value represented by one of these color spaces which are generally used may be used as a color component in the present invention.

Furthermore, the input image may be a mosaic image including pixels each of which has a signal value of a single color component or a demosaic image including pixels each of which has signal values of a plurality of color components obtained by performing a color-interpolation process (demosaicing process) on the mosaic image. The mosaic image is also referred to as a RAW image as an image which has not been subjected to image processing such as a color-interpolation process (demosaicing process), gamma conversion, and image compression using JPEG, for example. For example, when information on a plurality of color components is obtained in a single panel image pickup element, for example, color filters having different spectral transmittances are disposed in individual pixels and a mosaic image having pixels each of which has a signal value of a single color component is obtained. When the color-interpolation process is performed on the mosaic image, an image having pixels each of which has signal values of a plurality of color components can be obtained. Furthermore, when a multiplate image pickup element, i.e., an image pickup element having three plates is used, color filters having different spectral transmittances are disposed for individual image pickup elements and a demosaic image having image signal values of color components which are different among the image pickup elements is obtained. In this case, since pixels corresponding to one another among the image pickup elements have signal values of the different color components, an image including pixels each of which has signal values of a plurality of color components can be obtained without particularly performing the color-interpolation process.

Furthermore, various correction information used to correct the input image may be attached to the input image. The correction information includes information on an image pickup state (image-pickup-state information) such as a focal length (zoom position), an aperture value, an object distance (focusing distance), an exposure time, and an ISO sensitivity of a lens. In a case where a series of processes including a process of capturing an image to a process of outputting an image is performed by a single image pickup device, the image-pickup-state information and the correction information are not required to be attached to the input image but may be obtained within the device. However, in a case where a RAW image is obtained from the image pickup device and the image restoration process, a development process, and the like are performed in an image processing device which is provided separately from the image pickup device, the image-pickup-state information and the correction information are preferably attached to an image as described above. However, the correction information is not required to be attached to an image when a system in which the correction information is stored in the image processing device in advance and the correction information is selectable from the image-pickup-state information attached to the input image is constituted.

Note that although it is described that the input image is a digital image obtained by performing image capturing using an image pickup element through an image pickup optical system in the foregoing description, the input image may be a digital image obtained by an image pickup system which does not include an image pickup optical system. For example, an image may be obtained by an image pickup device which does not include an image pickup optical system including a lens, such as a scanner (reading device) or an X-ray image pickup device which performs image capturing by closely attaching an image pickup element onto an object surface. Such an image which is generated by an image pickup device which does not include an image pickup optical system and which is generated by image sampling using an image pickup element is more or less deteriorated. In this case, a deterioration characteristic does not depend on an OTF (narrowly-defined OTF) of the image pickup optical system but depends on a system transfer function of an image pickup system, and the system transfer function corresponds to the optic transfer function. Therefore, the "optic transfer function" in this embodiment of the present invention corresponds to a broader meaning of optic transfer function including the system transfer function of the image pickup system which does not include such an image pickup optical system.

Operation of Generating Image Restoration Filter

Figure 2A:
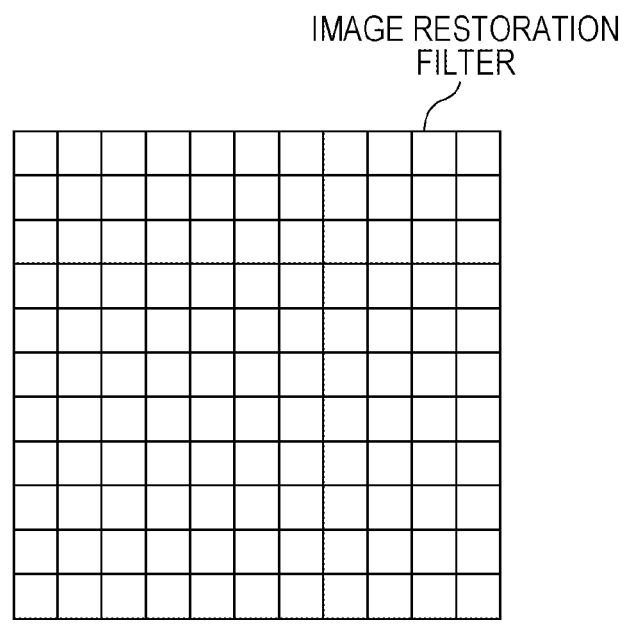
FIG. 2A is a diagram illustrating an image restoration filter.
Figure 2B:
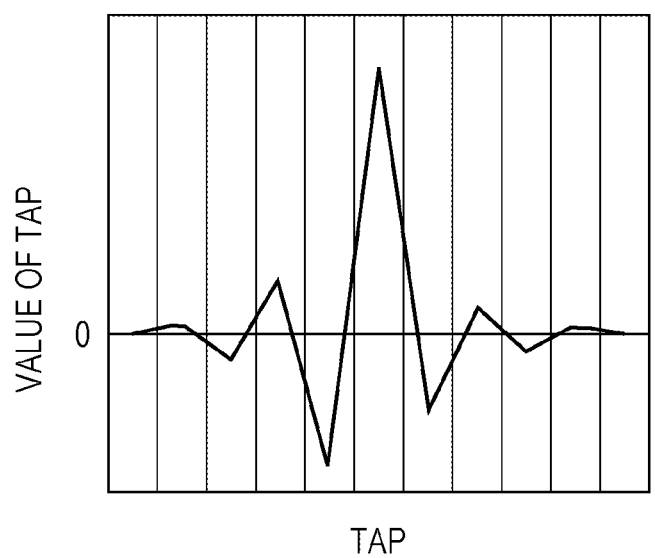
FIG. 2B is a diagram illustrating the image restoration filter.

Next, generation of an image restoration filter will be described with reference to FIGS. 2A and 2B. FIG. 2A is a diagram schematically illustrating an image restoration filter which performs a convolution process on pixels of an input image in a real space. The number of taps (cells) of the image restoration filter can be determined in accordance with an aberration characteristic of an image pickup system or required restoration accuracy. For a two-dimensional image, a two-dimensional image restoration filter having a number of taps corresponding to pixels included in the image is generally used. In FIG. 2A, a two-dimensional image restoration filter having taps in a matrix of 11×11 is shown. Furthermore, since generally as the number of taps of the image restoration filter increases, restoration accuracy is improved, the number of taps is set in accordance with required image quality, image processing capability, an aberration characteristic, and the like.

In FIG. 2A, values included in the taps are omitted. A sectional view of this image restoration filter is shown in FIG. 2B. Distribution of the values (coefficient values) of the taps of the image restoration filter is used to ideally return signal values which spatially spread due to aberrations to an original point when the convolution process is performed. That is, obtainment of an image restoration filter means obtainment of tap values (coefficients) of the image restoration filter in this specification.

To generate the image restoration filter, first, an optic transfer function (OTF) of an image pickup optical system is calculated or measured. In a case where an original image (deteriorated image) is obtained by a system which does not include an image pickup optical system, a deterioration characteristic of the image can be represented by an image pickup system transfer function, and therefore, an image restoration filter may be generated using the image pickup system transfer function as an optic transfer function (OTF). The term "Optic transfer function (OTF)" used hereinafter includes the transfer function of the image pickup system which does not include an image pickup optical system.

The image restoration filter used in the present invention is different from a conventional image restoration filter and has a function of correcting a difference between MTFs of azimuthal directions. Before the operation of generating the image restoration filter according to the present invention is described, a conventional Wiener filter will be described with reference to FIGS. 18A to 19.

Figure 18A:
FIG. 18A is a diagram illustrating a point spread function (PSF).
Figure 18B:
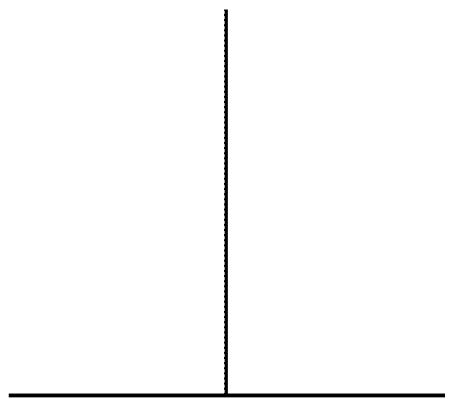
FIG. 18B is another diagram illustrating the point spread function (PSF).
Figure 18C:
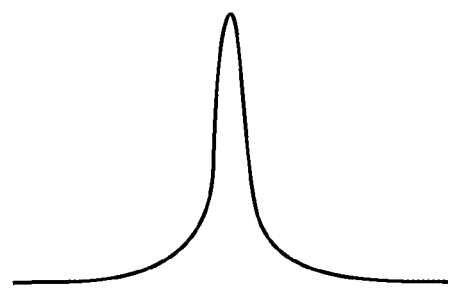
FIG. 18C is a further diagram illustrating the point spread function (PSF).
Figure 19:
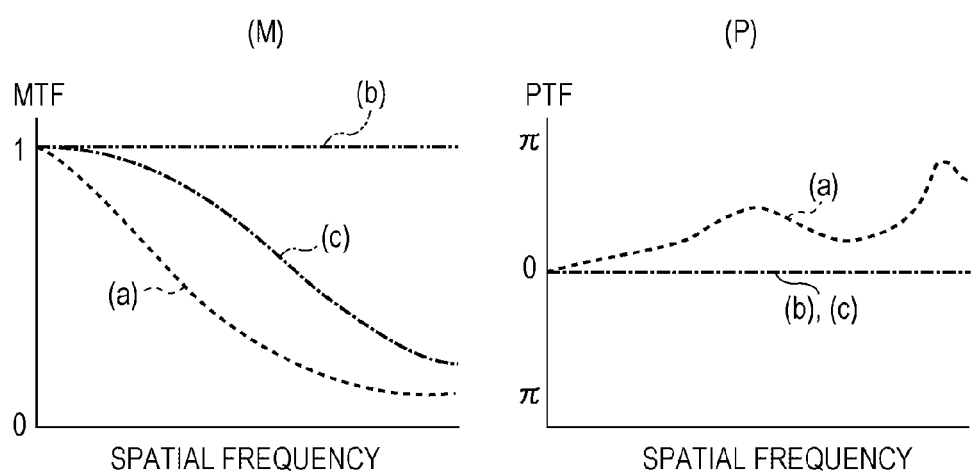
FIG. 19 includes diagrams illustrating amplitude components (MTFs) and phase components (PTFs) of an image.

A sectional view of a point spread function (PSF) of a certain color component in a certain position of an image in a meridional direction is shown in FIG. 18A and a frequency characteristic thereof is shown in FIG. 19. FIG. 19(M) shows an MTF which is an amplitude component and FIG. 19(P) shows a PTF which is a phase component. Furthermore, frequency characteristics corresponding to the PSFs (point spread functions) of FIGS. 18A to 18C correspond to dashed lines (a), two-dot chain lines (b), and dashed-dotted lines (c), respectively, shown in FIG. 19.

The PSF which has not been corrected shown in FIG. 18A has a asymmetry shape due to a comma aberration and the like, has an MTF characteristic which becomes lower as the frequency becomes higher as represented by the dashed line (A) of FIG. 19(M), and has a phase shift as represented by the dashed line (a) of FIG. 19(P). When the PSF shown in FIG. 18A is corrected using an image restoration filter generated by performing inverse Fourier transform on an inverse number (1/OTF(u, v)) of an optical transfer function (OTF), ideally, a delta function in which the PSF does not spread as shown in FIG. 18B is obtained.

Note that the inverse number of the OTF is referred to as an inverse filter, and a degree of restoration using the inverse filter (image restoration filter) is defined as a maximum degree of restoration in this specification.

An MTF corresponding to FIG. 18B maintains 1 in all frequencies as represented by the two-dot chain line (b) of FIG. 19(M), and a PTF maintains 0 in all frequencies as represented by the two-dot chain line (b) of FIG. 19(P).

However, as described above, when the image restoration filter is to be generated, influence of noise amplification should be adjusted. When the PSF shown in FIG. 18A is restored using the Wiener filter represented by Expression 1, a PSF shown in FIG. 18C which has a symmetry shape since a phase is corrected and which has small spread of the PSF, that is, a sharp-pointed shape, since amplitude is improved is obtained. An MTF corresponding to FIG. 18C is represented by the dashed-dotted line (c) shown in FIG. 19(M) in which a restoration gain is suppressed, a PTF corresponding to FIG. 18C is represented by the dashed-dotted line (c) shown in FIG. 19(P) which maintains 0 in all the frequencies. The reason that the PTF is corrected to 0 even when the restoration gain is suppressed will be described with reference to Expression 3.

Assuming that a white point light source is used as an object, phase shift is not generated as a frequency characteristic of the object and an amplitude characteristic maintains 1 in all the frequencies. Therefore, a frequency characteristic of an image obtained through the image pickup optical system corresponds to the optic transfer function (OTF) itself, and the image has distribution of pixel values of a PSF shape. That is, assuming that the frequency characteristic of the input image corresponds to an OTF, the OTF is multiplied by a frequency characteristic of the image restoration filter is to thereby obtain a frequency characteristic of a restoration image. When this is represented by an expression, H(u, v) corresponding to the OTF is cancelled and the frequency characteristic of the restoration image is represented by a right-hand member as shown in Expression 3.

$$H(u, v)M(u, v) = \frac{|H(u, v)|^2}{|H(u, v)|^2 + SNR^2}$$ (Expression 3)

Since the right-hand member |H(u, v)| is an absolute value (MTF) of the OTF, a phase component disappears irrespective of a value of a parameter SNR which determines a degree of restoration. Therefore, when phase deterioration components are corrected, the PSF is corrected to have a symmetry shape.

Figure 20:
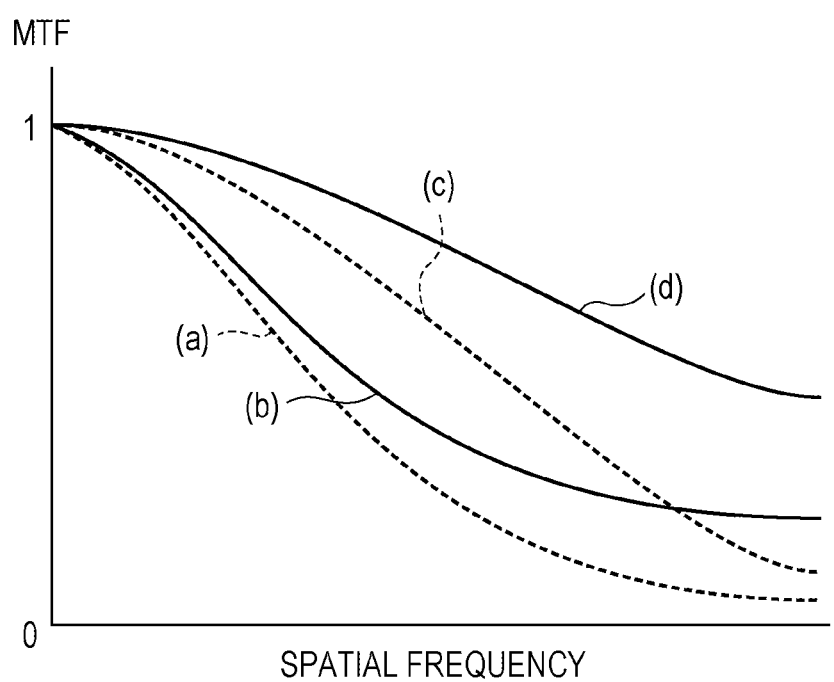
FIG. 20 is a diagram illustrating change of MTFs before and after an image restoration process in the related art.
Figure 23A:
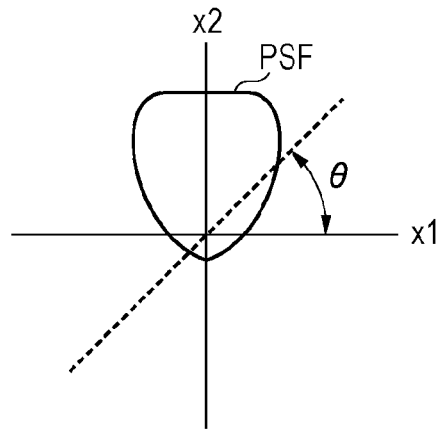
FIG. 23A is a diagram illustrating an azimuthal direction.
Figure 23B:
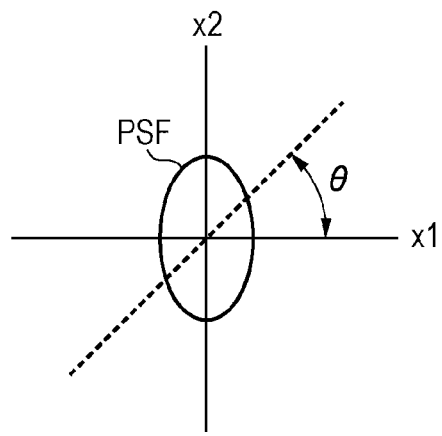
FIG. 23B is another diagram illustrating the azimuthal direction.
Figure 23C:
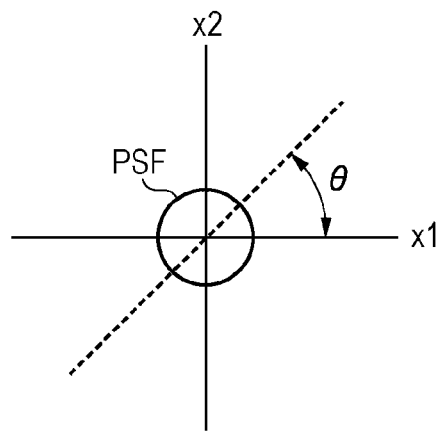
FIG. 23C is a further diagram illustrating the azimuthal direction.

However, since the phase deterioration components are corrected in the individual azimuthal directions, the PSFs are corrected to have the symmetry shape in the individual azimuthal directions, but the PSFs are not corrected to have a rotation symmetry shape since amplitude components in the individual azimuthal directions are different from each another. For example, when a comma aberration which causes a line symmetry shape shown in FIG. 23A is corrected so that a point symmetry shape is obtained, a PSF corresponding to astigmatism shown in FIG. 23B is obtained by the correction. Specifically, a PSF in which phases of the individual azimuthal directions are corrected and amplitudes of the azimuthal directions are different from each other is merely corrected to a point symmetry state. In a conventional image restoration method, a difference among MTFs in the azimuthal directions is not corrected but is increased as described with reference to FIG. 20. Therefore, use of the conventional image restoration method does not attain effective correction of an asymmetry aberration.

Next, an image restoration filter according to the present invention which has a function of correcting an asymmetry aberration of the present invention will be described. As is apparent from Expressions 1 and 3, a portion "rOTF" in Expression 4 represents a frequency characteristic obtained after an image obtained by capturing a white point light source is restored.

$$M(u, v) = \frac{1}{H(u, v)}[rOTF] \qquad \text{(Expression 4)}$$

Here, "rOTF" is an arbitrary function. Since a phase deterioration component of a restoration image is preferably zero, "rOTF" does not include a phase component but only include a real part, and therefore, "rOTF" is substantially equal to "rMTF". Although "rOTF" is preferably includes only a real part, it is apparent that a case where a value is assigned to an imaginary part in an allowable range is also included in a range of a modification of the present invention. That is, when the image restoration filter represented by Expression 4 is used, any object can be captured as an image which is captured by an image pickup optical system in which an optic transfer function (OTF) has an rOTF characteristic irrespective of a point light source.

Therefore, when Expression 5 which uses an OTF (rH(u, v)) which is common in the azimuthal directions is used, an image as if captured using an image pickup optical system in which differences among MTFs in the azimuthal directions are not generated can be obtained. That is, the image restoration filter used in this embodiment reduces a difference between MTFs in the two azimuthal directions of the image pickup system.

$$M(u, v) = \frac{1}{H(u, v)} \frac{|rH(u, v)|^2}{|rH(u, v)|^2 + SNR^2} \qquad \text{(Expression 5)}$$

Figure 3:
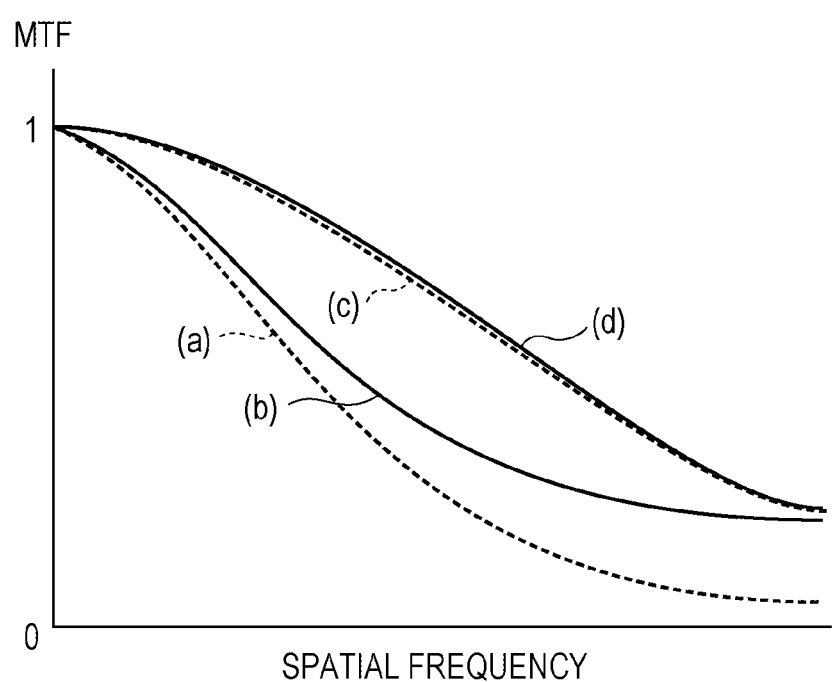
FIG. 3 is a first diagram illustrating amounts of correction of MTFs in azimuthal directions.

This case will be described with reference to FIG. 3. FIG. 3 is a diagram illustrating change of MTFs in two azimuthal directions, i.e., an azimuthal direction before restoration and an azimuthal direction after restoration when a process is performed using the image restoration filter according to the present invention and when an object is a point light source. A dashed line (a) and a solid line (b) represent MTFs before restoration in first and second azimuthal directions. A dashed line (c) and a solid line (d) represent MTFs after restoration in the first and second azimuthal directions. The MTFs before restoration are different from each other depending on the azimuthal directions as denoted by the lines (a) and (b). However, the MTFs after restoration are substantially the same as each other irrespective of the azimuthal directions as denoted by the lines (c) and (d). The lines (a) and (b) shown in FIG. 3 correspond to MTFs in a meridional direction and a sagittal direction, respectively, for example. As described above, use of the image restoration filter enables correction of the difference between the MTFs in the different azimuthal directions for restoration.

Figure 4:
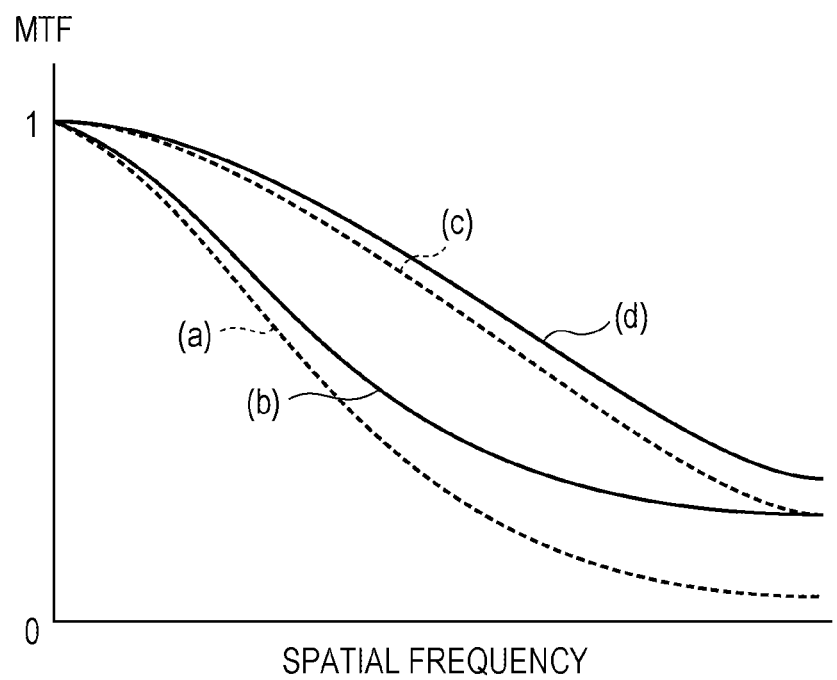
FIG. 4 is a second diagram illustrating amounts of correction of MTFs in azimuthal directions.

Furthermore, although the OTF (rH(u, v)) which is common in the azimuthal directions is used in Expression 5, rH(u, v) may be corrected so that a difference between OTFs in the azimuthal directions is reduced to be smaller than a difference between OTFs before restoration whereby rotational symmetry can be adjusted. FIG. 4 shows an example thereof. As denoted by the lines (c) and (d) shown in FIG. 4, even when MTFs after restoration in the two azimuthal directions do not coincide with each other, a difference between the MTFs in the azimuthal directions is reduced when compared with the lines (c) and (d) in FIG. 20 and asymmetry of a PSF is reduced. In order to obtain an effect of correction of the asymmetry, at least a filter which enables a difference between MTFs after restoration to be smaller than a difference between MTFs before restoration in azimuthal directions is preferably used.

The image restoration filter of this embodiment is configured such that a difference between the MTFs (absolute values of transfer functions) in the two azimuthal directions obtained when a restoration image is obtained from an object becomes smaller than a difference between MTFs in two azimuthal directions of the image pickup system.

In other words, when an object is a white point light source, the image restoration filter of this embodiment performs restoration such that a difference between spectrums in two azimuthal directions of the restoration image is smaller than a difference between spectrums in two azimuthal directions of the input image.

That is, the image restoration filter of this embodiment is generated on the basis of transfer functions having different frequency characteristics in the two azimuthal directions and a correction transfer function used to correct a difference between absolute values of the transfer functions of the two azimuthal directions to be small.

As described above, by executing an image restoration process using the image restoration filter according to the present invention, a difference between phase components of the individual azimuthal directions and a difference between amplitude components of the azimuthal directions which cause the aberration can be corrected, and a higher-accuracy image can be obtained by reducing the asymmetry of the aberration.

Note that, in the image restoration filter, since a portion of H(u, v) included in Expression 5 is varied depending on the azimuthal directions, asymmetry coefficient array is obtained irrespective of whether rH(u, v) is common in the azimuthal directions. That is, the sectional view shown in FIG. 2B is varied depending on the azimuthal directions.

Note that the optical transfer function (OTF) may include not only a factor which causes deterioration of the image pickup optical system but also a factor which causes deterioration of the optical transfer function (OTF) in the cause of image capturing. For example, an optical low-pass filter having birefringence suppresses a high-frequency component of a frequency characteristic of an optical transfer function (OTF). Furthermore, shapes of pixel apertures and a pixel aperture ratio of an image pickup element also affect the frequency characteristic. In addition, a spectroscopic characteristic of a light source and spectroscopic characteristics of various wavelength filters are included. The image restoration filter is preferably generated on the basis of a broader meaning optic transfer function (OTF) including these characteristics.

Image Restoration Process Operation (Correction Operation)

Next, a method for obtaining a corrected image using the generated image restoration filter will be described. As described hereinabove, a corrected image (restoration image) can be obtained by convolving on a deteriorated image with the image restoration filter in a correction operation. Here, a convolution (convolution integration or convolution product sum) process is performed on pixels included in taps of the image restoration filter. The convolution is performed such that, in order to improve a signal value of a certain pixel, the pixel is brought to coincide with a center of the image restoration filter. Then, products of signal values of pixels and a coefficient value of the image restoration filter are obtained for individual pixels corresponding to the image restoration filter and a total sum of the products is used as a signal value of a center pixel.

An advantage for operating the image restoration filter on the input image and performing the convolution process is to restore an image without performing Fourier transform or inverse Fourier transform on the image in the image restoration process. In general, a load of the convolution process is smaller than that of the Fourier transform. Therefore, a processing load can be reduced when the image restoration process is performed.

Note that, although the number of taps which are vertically and horizontally arranged in the image restoration filter has been described, the number of vertical taps does not have to be equal to the number of horizontal taps and the numbers are arbitrarily changed and determined when the convolution process is performed.

Furthermore, in the image restoration process of the present invention, a reversal process for restoring the image to an original image which has not been deteriorated is performed with higher accuracy when a deterioration process of an image is linear shape. Accordingly, an input image is preferably not subjected to any adaptive nonlinear process. Specifically, the image restoration process is preferably performed on a mosaic image (RAW image). However, even when the input image is a mosaic image or a demosaic image, the image restoration process of the present invention may be employed. This is because, when a deterioration process in a color interpolation process has a linear shape, the image restoration process may be performed taking a deterioration function into consideration when the image restoration filter is generated. Furthermore, when a required accuracy of the restoration is low or when only an image which has been subjected to various image processes can be obtained, asymmetry of a blur is reduced even when the image restoration process is performed on a demosaic image.

Image Output Process

A corrected image (restoration image) obtained by the process described above is output to a desired device. When an image pickup device is used, the image is output to a display unit, a recording medium, or the like. If another image process is to be performed on an image which has been subjected to the image restoration process, the image should be output to a device which executes subsequent operations.

The operations included in the image process of the present invention has been sequentially described hereinabove. Among the operations, some operations may be simultaneously performed if possible. Furthermore, before or after each of the operations, a required processing operation may be added where appropriate. Moreover, Expressions, equal marks, and symbols do not limit concrete algorithms of the image process according to the present invention, and modifications may be made where appropriate within a range in which an object is attained.

Hereinafter, embodiments which employ the image process described above will be described with reference to the accompanying drawings.

First Embodiment

Figure 5:
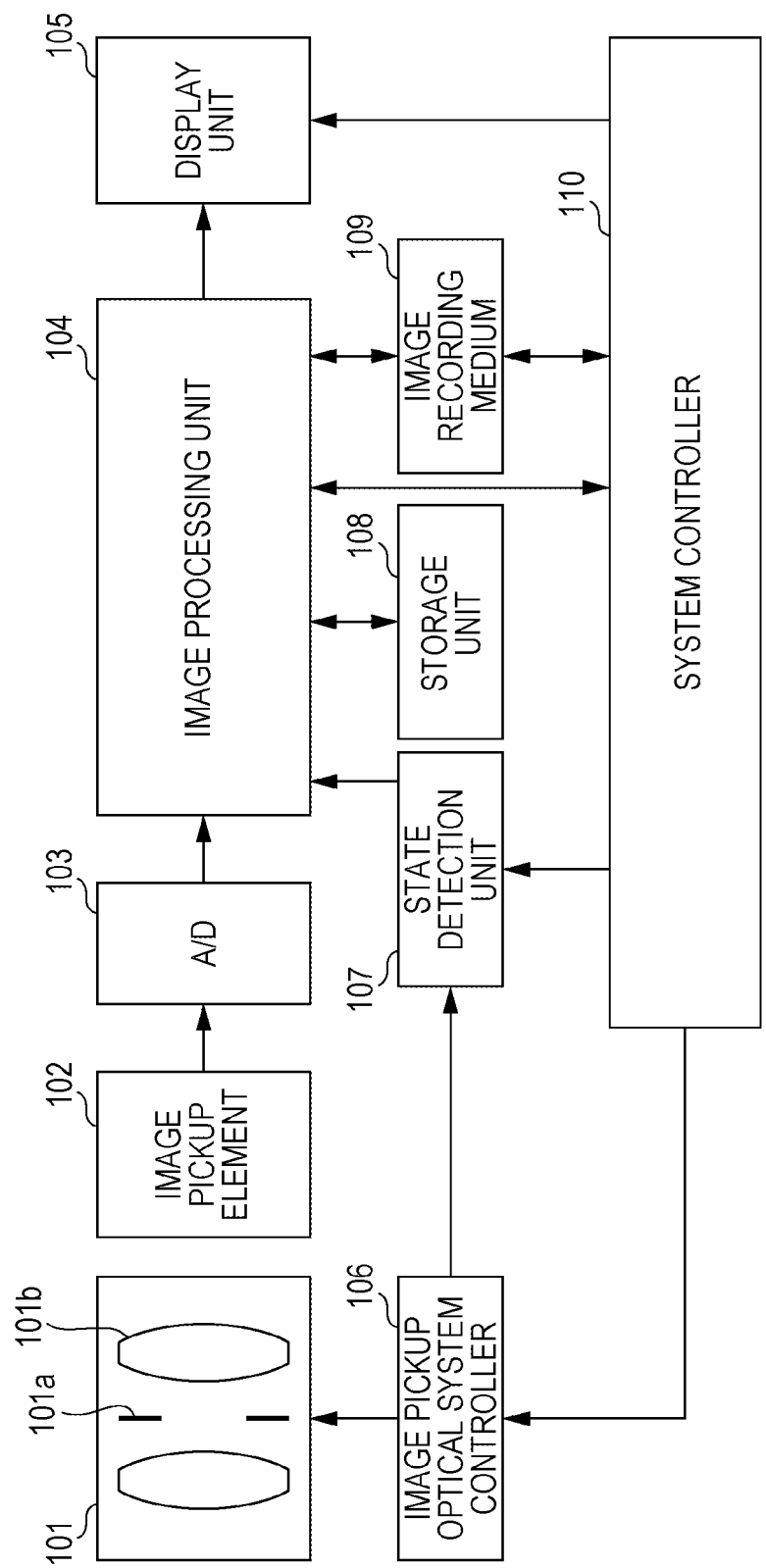
FIG. 5 is a block diagram illustrating a basic configuration of an image pickup device.

FIG. 5 is a diagram schematically illustrating a configuration of an image pickup device according to a first embodiment. An object image not shown is formed on an image pickup element 102 using an image pickup optical system 101. The image pickup element 102 converts formed light into an electric signal (photoconversion), and an A/D converter 103 converts the electric signal into a digital signal. Then, an image processing unit 104 performs an image process on the digital signal (input image) in addition to predetermined processes. Here, the predetermined processes include electric aberration correction such as correction of a magnification chromatic aberration, correction of a distortion aberration, and correction of a peripheral brightness, demosaicing, gamma conversion, and image compression.

First, image pickup state information of the image pickup device is obtained from a state detection unit 107. The state detection unit 107 may obtain the image pickup state information directly from a system controller 110 or may obtain image pickup state information regarding the image pickup optical system 101 from an image pickup optical system controller 106. Next, an image restoration filter is selected from a storage unit 108 in accordance with an image pickup state, and an image restoration process is performed on the image input to the image processing unit 104. An image restoration filter which is selected from the storage unit 108 taking the image pickup state into consideration may be used as it is or an image restoration filter which is provided in advance and which is corrected so as to be more suitable for the image pickup state may be used.

Then, an output image which is processed by the image processing unit 104 is stored in an image recording medium 109 in a predetermined format. The output image is obtained as an image in which asymmetry caused by an aberration is corrected and therefore sharpness is improved. Furthermore, in a display unit 105, an image obtained by performing a predetermined process on the image which has been subjected to the image restoration process may be displayed or an image which has not been subjected to a correction process or which has been subjected to a simple correction process for high speed display may be displayed.

A series of the control operations described above is performed by the system controller 110, and mechanical driving of the image pickup system is performed by the image pickup optical system controller 106 in response to an instruction issued by the system controller 110. A size of an aperture 101a is adjusted as a setting of the image pickup state regarding an F number. A position of a focus lens 101b is adjusted by an auto focus (AF) mechanism or a manual focus mechanism, not shown, to perform focus adjustment in accordance with an object distance.

The image pickup system may include an optical element such as a low-pass filter or an infrared cutoff filter. When an element which affects a characteristic of an optic transfer function (OTF) of the low-pass filter or the like is used, the influence caused by the element should be taken into consideration when the image restoration filter is generated so that the restoration process is performed with higher accuracy. Similarly, since the infrared cutoff filter affects PSFs of RGB channels which are integral values of point spread functions (PSF) of spectroscopic wavelengths, especially, affects a PSF of an R channel, such influence is more preferably taken into consideration when the image restoration filter is generated.

Furthermore, although the image pickup optical system 101 is configured as a portion of the image pickup device, an interchangeable image pickup optical system used in a single-lens reflex camera may be used as the image pickup optical system 101. The control of a size of an aperture and a manual focusing function do not have to be used depending on an object of the image pickup device.

Furthermore, since an optic transfer function (OTF) is changed depending on a height of an image (position of an image) of the image pickup system even in one image pickup state, the image restoration processing of the present invention is preferably changed depending on the height of the image.

Moreover, the image processing unit 104 includes at least a calculation unit and a temporal storage unit (buffer). For each of the operations included in the image process described above, image writing (storage) and image reading are temporarily performed on the storage unit where appropriate. Moreover, a storage unit used for temporal storage is not limited to the temporal storage unit (buffer) and may correspond to the storage unit 108. A suitable storage unit may be appropriately selected from among storage units which have a storage function in accordance with data capacity or communication speed of the storage units. In addition, the storage unit 108 includes an image restoration filter and data such as correction information.

Figure 6:
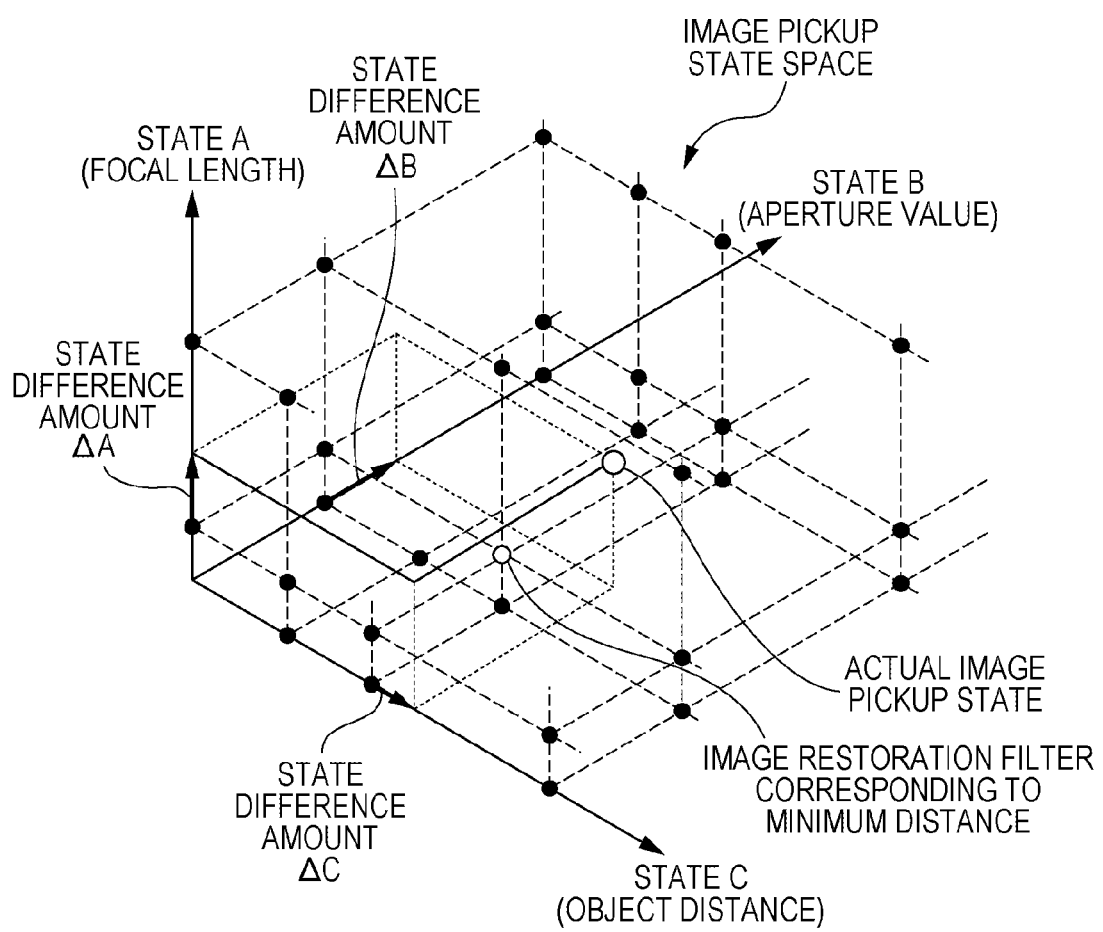
FIG. 6 is a diagram illustrating selection and correction of an image restoration filter according to a first embodiment.

Selection and correction of an image restoration filter will be described with reference to FIG. 6. FIG. 6 schematically shows image pickup state information and a plurality of image restoration filters (black circles) stored in the storage unit 108 in accordance with the image pickup state information. The image restoration filters stored in the storage unit 108 are discretely disposed in an image pickup state space having axes corresponding to three image pickup states including a focal length (state A), an aperture value (state B), and an object distance (a focusing distance) (state C). Coordinates of the points (black circles) included in the image pickup state space represent the image restoration filters stored in the storage unit 108. Note that, in FIG. 6, the image restoration filters are disposed at grid points on lines which extend orthogonal to the image pickup states. However, the image restoration filters may be disposed in positions other than the grid points. Furthermore, types of image pickup state are not limited to the focal length, the aperture value, and the object distance and the number of the types of image pickup state is not limited to three. Four or more dimensional image pickup state space including four or more image pickup states may be configured and image restoration filters may be discretely disposed in the image pickup state space.

In FIG. 6, it is assumed that an image pickup state represented by a large white circle is an actual image pickup state detected by the state detection unit 107. When an image restoration filter is disposed in advance in a position corresponding to the actual image pickup state or in the vicinity of the position corresponding to the actual image pickup state, the image restoration filter is selected to be used in an image restoration process. In this case, as a method for selecting an image restoration filter disposed in the vicinity of the position corresponding to the actual image pickup state, distances (difference amounts of image pickup states) between the actual image pickup state and a plurality of image pickup states where the image restoration filters are stored in the image pickup state space are calculated. Then, one of the image restoration filters which is positioned corresponding to the minimum distance is selected in this method. Using this method, an image restoration filter positioned at a small white circle shown in FIG. 6 is selected.

Furthermore, as another method, weighting regarding directions in the image pickup state space is performed for selection of an image restoration filter. Specifically, a product of a distance and a weighting direction in the image pickup state space is used as an evaluation function, and one of the image restoration filters which has the largest evaluation function value is selected.

Next, a method for newly generating an image restoration filter by correcting the selected image restoration filter will be described. When the image restoration filter is to be corrected, a distance (state difference amount) between the actual image pickup state and an image pickup state in which the image restoration filter is stored in the image pickup state space is calculated, and one of the image restoration filters located in a position corresponding to the shortest distance (smallest state difference amount) is selected. When the image restoration filter corresponding to the smallest state difference amount is selected, a small correction amount of the image restoration filter is attained, and an image restoration filter which is close to an image restoration filter appropriate for the image pickup state can be generated.

In FIG. 6, the image restoration filter located in the position corresponding to the small white circle is selected. State difference amounts ΔA, ΔB, and ΔC between the actual image pickup state and the image pickup state corresponding to the selected image restoration filter are calculated. A state correction coefficient is calculated in accordance with the state difference amounts and the selected image restoration filter is corrected using the state correction coefficient. By this, the image restoration filter corresponding to the actual image pickup state can be generated.

Furthermore, as another method, a plurality of image restoration filters located in the vicinity of the actual image pickup state are selected and an interpolation process is performed in accordance with state difference amounts between the actual image pickup state and the plurality of image restoration filters so that an image restoration filter suitable for the image pickup state can be generated. In the interpolation process, coefficient values of corresponding taps of two-dimensional image restoration filters are subjected to linear interpolation, polynomial interpolation, spline interpolation, or the like.

Furthermore, an optic transfer function (OTF) used for generation of an image restoration filter may be obtained by a calculation using an optical design tool or an optical analysis tool. Furthermore, an optic transfer function (OTF) in an actual state of a single body of an image pickup optical system or an image pickup device may be obtained by measurement.

Figure 7:
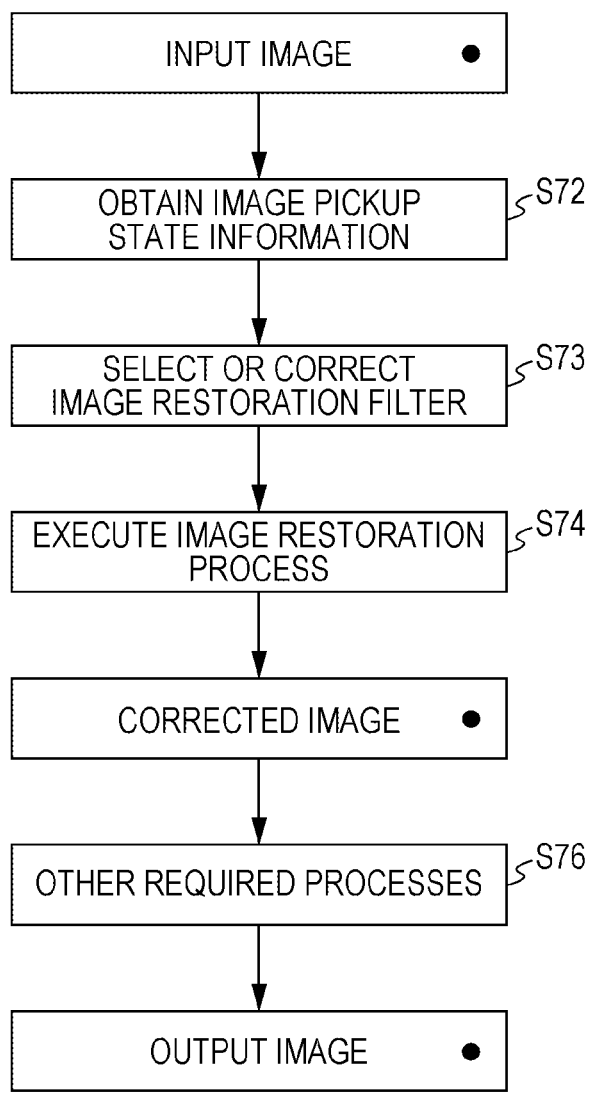
FIG. 7 is a flowchart illustrating a procedure of an image process according to the first embodiment.

FIG. 7 shows a flowchart illustrating an image restoration process of this embodiment executed by the image processing unit 104 in detail. Dots included in FIG. 7 represent steps of at least temporarily storing pixel data of an image or the like.

The image processing unit 104 obtains an input image in an image obtaining operation. Next, the image processing unit 104 obtains image pickup state information from the state detection unit 107 (in step S72). Then, an image restoration filter corresponding to an image pickup state is selected from the storage unit 108 (in step S73), and a restoration process is performed on the input image using the image restoration filter in an image restoration process operation (correction operation) (in step S74).

Next, other processes required for image forming are performed and a restoration image is output (in step S76). Examples of the other processes include a color interpolation process (demosaicing process), shading correction (peripheral brightness correction), distortion aberration correction, and the like when the corrected image is a mosaic image. Furthermore, the image processes including the other processes described herein may be inserted before or after the flow or in the course of the flow.

Figure 8:
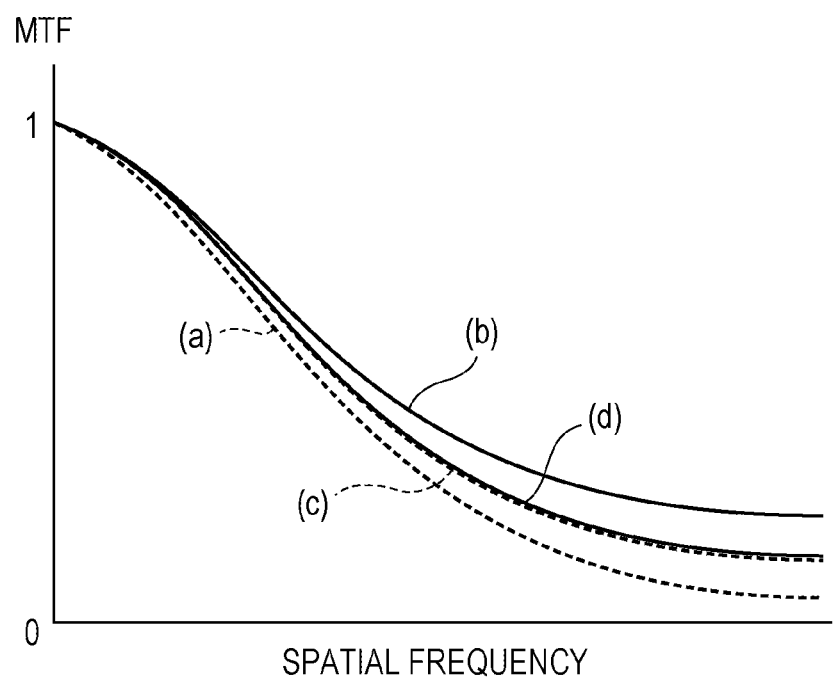
FIG. 8 is a diagram illustrating change of MTFs before and after the image process.

Here, a more preferable example of a flow of the image restoration process will be described with reference to FIG. 8. FIG. 8 shows changes of MTFs before and after the restoration process is performed. A dashed line (a) and a solid line (b) correspond to MTFs in first and second azimuthal directions, respectively, before the image restoration process is performed and a dashed line (c) and a solid line (d) are MTFs in the first and second azimuthal directions, respectively, after the restoration process is performed. As shown in FIG. 8, the image restoration process is performed with a low restoration degree on the MTFs (a) and (b) in the two azimuthal directions before restoration. By this, a difference between the azimuthal directions is corrected while the MTFs are in low states as denoted by the lines (c) and (d). In this state, although phase components of an aberration and asymmetry properties of the aberration are corrected, sharpness is low. In other words, assuming that a restoration degree of a restoration image when an inverse filter is used as an image restoration filter is determined as the maximum restoration degree, a restoration image having a restoration degree lower than the maximum restoration degree is obtained. Within a Nyquist frequency, a frequency average of the MTFs in the two azimuthal directions after restoration is preferably equal to or smaller than 1.5 times a frequency average of the maximum MTFs before restoration. More preferably, the frequency average is equal to or smaller than 1.2 times the frequency average of the maximum MTFs before restoration. Furthermore, more preferably, between the two azimuthal directions, in the first azimuthal direction corresponding to the high MTFs, only phases are restored and the MTFs are not substantially changed. Then, in the second azimuthal direction corresponding to the lower MTFs, the phases are restored, and the MTFs in the second azimuthal direction preferably coincide with the MTFs in the first azimuthal direction. On the restoration image obtained through the restoration process, an edge emphasis process is performed.

By this, since sharpness of only edge portions can be improved, noise amplification can be suppressed when compared with a case where the restoration process is performed on the entire image.

The edge emphasis process will be described with reference to FIG. 9. FIG. 9 shows an example of an edge emphasis filter. A filter which performs edge emphasis can be generated by a difference between a filter which outputs an input image without change and a differential filter as shown in FIG. 9. As the differential filter, a Sobel filter which performs first derivation and a Laplacian filter which performs second derivation are well known. The differential filter shown in FIG. 9 is the Laplacian filter. The edge emphasis filter having taps of a matrix of approximately three rows and approximately three columns is frequently used as shown in FIG. 9 to perform a process using the relationships between pixel values of adjacent pixels.

Figure 10A:
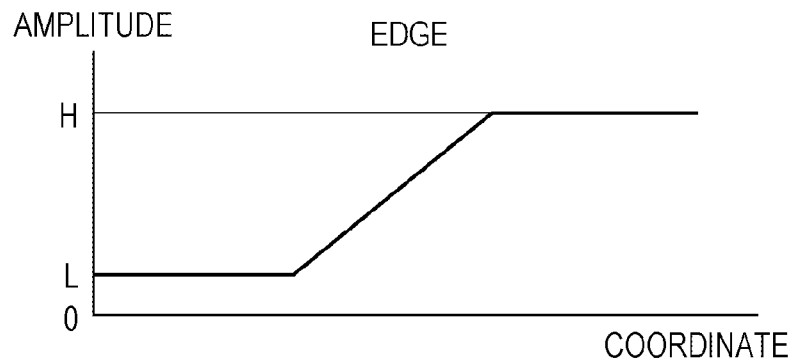
FIG. 10A is a sectional view of an edge when the edge emphasis filter is employed.
Figure 10B:
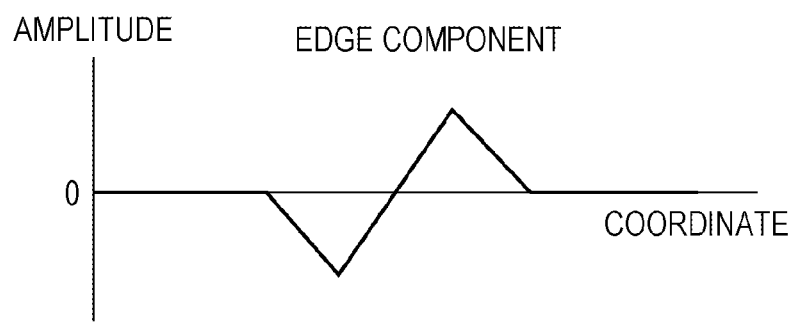
FIG. 10B is another sectional view of the edge when the edge emphasis filter is employed.
Figure 10C:
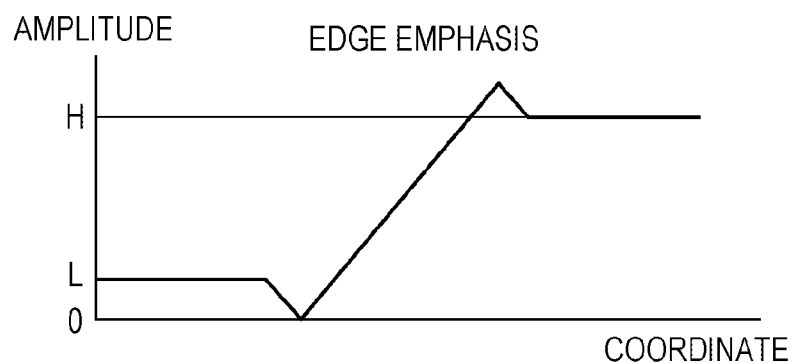
FIG. 10C is a further sectional view of the edge when the edge emphasis filter is employed.

FIGS. 10A to 10C show an emphasis effect of an edge portion when the edge emphasis filter shown in FIG. 9 is used. FIGS. 10A to 10C are sectional views obtained when luminance of an edge portion included in an image are viewed from a certain section. Axes of abscissa denote coordinates and axes of ordinate denote amplitudes. FIG. 10A is a sectional view of luminance of the edge portion of the image. When this luminance sectional view is subjected to the differential filter so that the edge portion is extracted and sign inversion is performed, FIG. 10B is obtained. When FIG. 10B is added to the original image shown in FIG. 10A, inclination of the edge can be remarkably emphasized as shown in FIG. 10C. Since the edge emphasis process is performed only on a precipitous portion of an edge so that sharpness is attained, noise amplification less affects the entire image and the process can be performed at high speed since the number of taps of the filter is comparatively small, which are advantages. Therefore, it is more preferable that the edge emphasis process is performed after an image restoration process is performed with a low restoration degree. When the edge emphasis process is additionally performed, the edge emphasis process should be included in the other required processes in FIG. 7. Examples of a process which can emphasize an edge portion of an image include a sharpness process.

Although the preferable anteroposterior relationships of the processing operations and considerable processes have been described hereinabove, an order of the processing operations is not limited to this when the order of the processing operations is restricted from a different standpoint and modifications may be made in accordance with a restriction condition of the process or required image quality. Furthermore, although the embodiment regarding the image pickup device has been described, various modifications and alterations may be made within the scope of the invention.

Second Embodiment

Figure 11A:
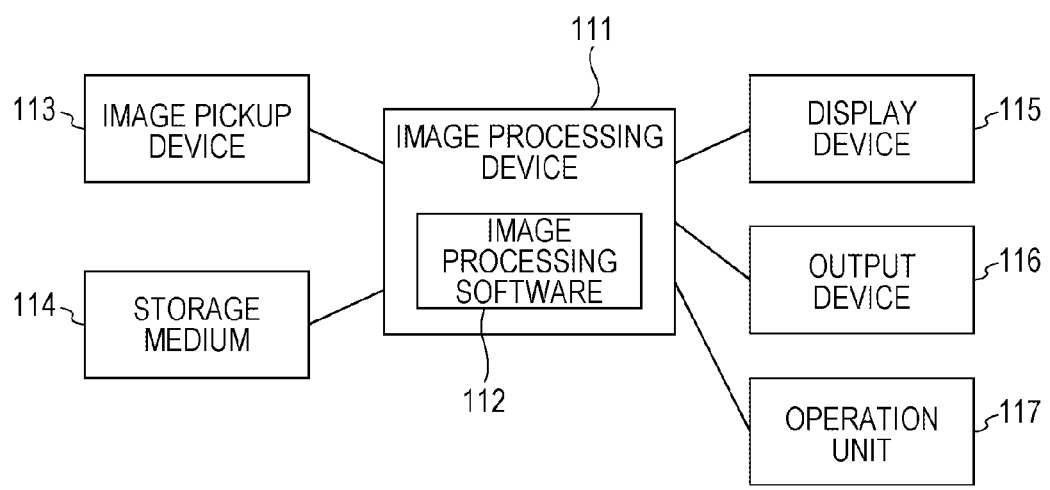
FIG. 11A is a diagram illustrating an image processing system according to a second embodiment.

FIG. 11A is a diagram illustrating a configuration of an image processing system according to a second embodiment of the present invention. An image processing device 111 is constituted by an information processing apparatus and includes image processing software (image processing program) 112 which causes the information processing device to execute the image processing method described in the first embodiment.

An image pickup device 113 includes a camera, a microscope, an endoscope, a scanner, and the like. A storage medium 114 corresponding to a semiconductor memory, a hard disk, a server on a network, or the like stores an image (captured image data) generated by image capturing.

The image processing device 111 obtains image data from the image pickup device 113 or the storage medium 114 and output image (corrected image) data obtained through a predetermined image process to at least one of an output device 116, the image pickup device 113, and the storage medium 114. Furthermore, a storage unit incorporated in the image processing device 111 may be used as a destination of the output so as to store the output image data. Examples of the output device 116 include a printer. A display device 115 which is a monitor is connected to the image processing device 111. A user can perform an image processing operation using the display device 115 and can evaluate an adjusted restoration image (output image). The image processing software 112 has a development function and other image processing functions where appropriate in addition to an image restoration processing function and a restoration degree adjusting function.

Figure 11B:
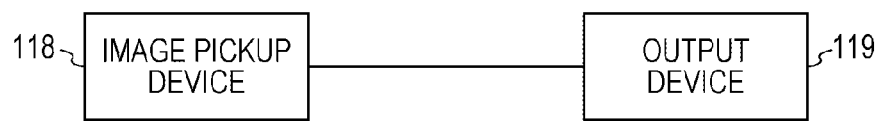
FIG. 11B is a diagram illustrating another image processing system according to the second embodiment.

Furthermore, FIG. 11B shows a configuration of another image processing system. As with the first embodiment, when the image process of the first embodiment is performed solely using an image pickup device 118, an adjusted restoration image can be directly output from the image pickup device 118 to an output device 119.

Furthermore, when the output device 119 includes an image processing device which executes the image processing method of the first embodiment, the output device 119 can set an adjusting coefficient in accordance with a feature value of an image and adjust a restoration degree. Moreover, since the restoration degree is adjusted in accordance with a deterioration characteristic of the output image of the output device 119, a higher quality image can be provided.

Figure 12:
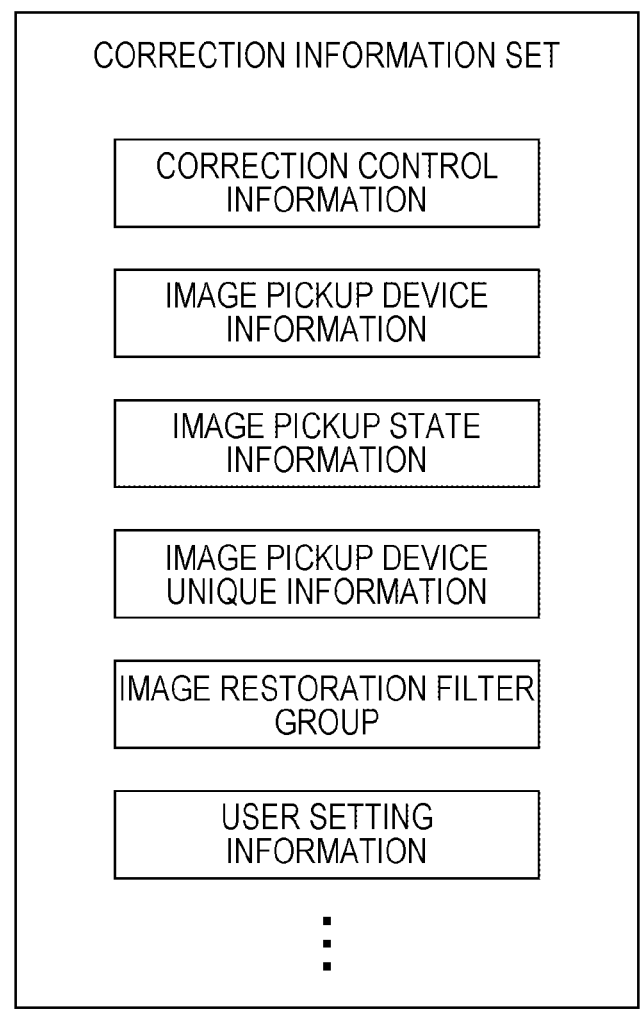
FIG. 12 is a diagram illustrating correction information according to the second embodiment.

Here, content of correction information used to perform the image process including the image restoration process and the adjustment of the restoration degree and transmission of the correction information will be described. FIG. 12 shows an example of the correction information and a plurality of correction information is referred to as a correction information set. The correction information will be described hereinafter.

Correction Adjusting Information

Correction adjusting information includes setting information representing whether a restoration process and a restoration degree adjusting process are performed by the image pickup device 113, the image processing device 111, or the output device 116 and selection information used to select data to be transmitted to another device in accordance with the setting information. For example, the image pickup device 113 performs only the restoration process and the image processing device 111 performs adjustment of a restoration degree, an image restoration filter does not have to be transmitted to the image processing device 111 but at least a captured image and a restoration image or restoration component information (difference information) should be transmitted.

Image Pickup Device Information

Image pickup device information is identification information of the image pickup device 113 and corresponds to a product name. When an interchangeable lens and an interchangeable camera body are used, the identification information includes a combination thereof.

Image Pickup State Information

Image pickup state information represents a state of the image pickup device 113 at a time of image capturing. For example, the image pickup state information includes a focal length (zoom position), an aperture value, an object distance (focusing distance), an ISO sensitivity, a white balance setting, and the like.

Image Pickup Device Unique Information

Image pickup device unique information is identification information of individual image pickup devices which is different from the image pickup device information. Since optic transfer functions (OTFs) of image pickup devices vary due to variation of manufacturing errors, the image pickup device unique information is effective for setting appropriate restoration degree adjusting parameters for the individual image pickup devices. The restoration degree adjusting parameters correspond to a restoration strength adjusting coefficient μ and a color synthesis ratio adjusting coefficients ω which will be described in a third embodiment onwards.

Image Restoration Filter Group

An image restoration filter group is a set of image restoration filters used in an image restoration process. When a device which performs the image restoration process does not include an image restoration filter, an image restoration filter should be transmitted from another device (apparatus).

User Setting Information

User setting information is an adjusting parameter or an adjusting parameter correction function used to adjust a restoration degree so that a restoration degree desired by the user can be obtained. The user can set a variable adjusting parameter. However, when the user setting information is used, a desired output image can be normally obtained as an initial value. Furthermore, the user setting information is preferably updated using a learning function with reference to a history of determination of the adjusting parameter performed by the user so that the most desired sharpness degree is obtained.

Furthermore, preset values corresponding to some sharpness patterns may be provided by a provider (manufacturer) of the image pickup device through a network.

The correction information set described above is preferably attached to each image data. When required correction information is attached to image data, the image restoration process can be performed by any apparatus which incorporates the image processing device according to the second embodiment. Furthermore, content of the correction information set can be automatically or manually obtained or discarded where appropriate.

The present invention is not limited to the foregoing embodiments, and various alterations and modifications may be made without departing from the spirit and the scope of the present invention. Accordingly, in order to publicize the scope of the present invention, the following claims are attached.

Third Embodiment

In the third embodiment, an example of a process of generating a more appropriate image using the image restoration filters according to the first and second embodiments will be described. By performing the process of this embodiment, a restored image having image quality of a high degree of freedom can be generated. The third embodiment will be described with reference to the accompanying drawings.

Figure 13:
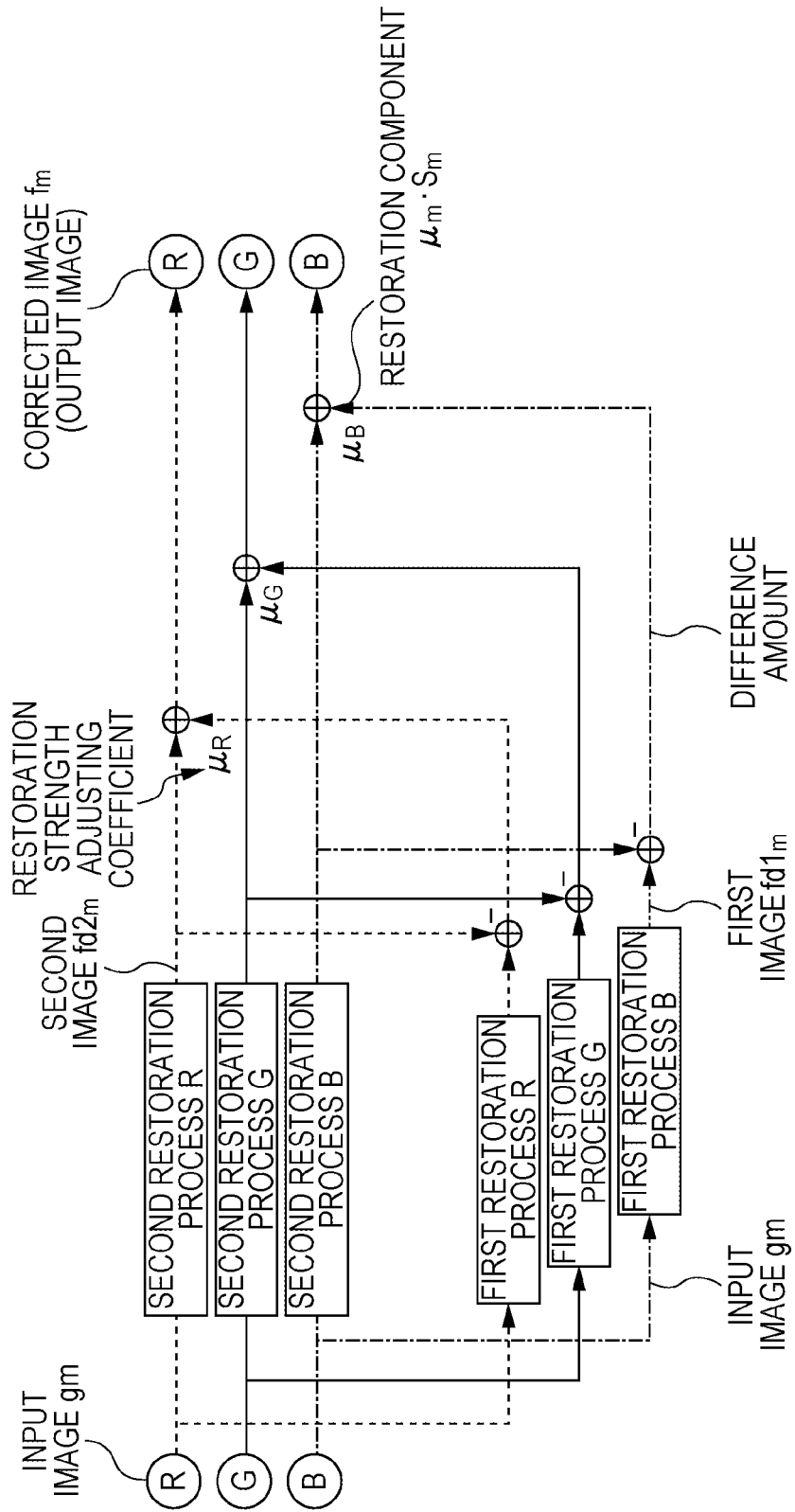
FIG. 13 is a diagram illustrating a procedure of image process according to a third embodiment.

FIG. 13 shows a flow of an image processing method executed in this embodiment. In a description below, a reference character m denotes a color component (R, G, or B, for example) of an image. Specifically, "$A_m$" denotes $A_R$, $A_G$, and $A_B$ corresponding to an R component of A, a G component of A, and a B component of A, respectively. "A" corresponds to g, f, fd, S, Sd, and the like shown in FIG. 13.

A first restoration process is performed on an input image $g_m$ having the color components R, G, and B using image restoration filters selected or generated for individual color components so that a first image $fd1_m$ (first restoration image) is generated (first restoration image generation means).

Sharpness of the first image $fd1_m$ (first restoration image) is improved since a phase component of an OTF (optic transfer function) is corrected. Furthermore, since the correction is performed such that characteristics of MTFs in azimuthal directions relatively coincide with each other for individual color components (such that a difference between the characteristics in the azimuthal directions is reduced), aberration asymmetry can be reduced. The MTFs are amplitude components (absolute values) of a transfer function of an image pickup system (an optic transfer function of an image pickup optical system). When an object (an object included in a field) is a white point light source, the MTFs correspond to spectrums of an image. In this case, a difference between a frequency average of spectrums in a first azimuthal direction of the first image $fd1_m$ and a frequency average of spectrums in a second azimuthal direction is reduced to be smaller than a difference between a frequency average of spectrums in a first azimuthal direction of an image before restoration and a frequency average of spectrums in a second azimuthal direction of the image before restoration. Specifically, a difference between average values of spectrums in two azimuthal directions of a restoration image after image restoration is smaller than a difference between average values of spectrums in two azimuthal directions of an image before image restoration. Hereinafter, a process of generating a first restoration image will be described as a first (image) restoration process.

Note that noise, ringing, a false color, and the like are included in the image. The false color is a color generated due to the image restoration process.

On the other hand, a second restoration process is performed on the input image $g_m$ for individual color components so that a second image $fd2_m$ (second restoration image) is obtained. The second image $fd2_m$ has a restoration degree set lower than that of the first image $fd1_m$. More specifically, when an object is a white point light source, a frequency average of spectrums of the image corresponding to a specific color component of the second image $fd2_m$ is lower than a frequency average of spectrums of the image corresponding to the specific color component of the first image $fd1_m$. Hereinafter, a process of generating the second restoration image is referred to as a second (image) restoration process.

Note that, also in the second restoration process, restoration is preferably performed so that a difference between MTF characteristics in azimuthal directions is reduced when compared with a difference before restoration.

Note that the input image may be used as the second image $fd2_m$ without performing the second restoration process described above.

By subtracting signal values of the second image $fd2_m$ from corresponding signal values of the first image $fd1_m$ for individual pixels as represented by Expression 6, restoration component information $S_m$ (difference information) as difference information between the first image $fd1_m$ and the second image $fd2_m$ for individual color components is generated.

$$S_m = fd1_m - fd2_m \qquad \text{Expression 6}$$

Then, as represented by Expression 7, the restoration component information $S_m$ is synthesized with the second image $fd2_m$ in accordance with a restoration strength adjusting coefficient $\mu_m$ for individual color components so that a correction image $f_m$ is obtained as an adjusted restoration image (output image).

$$f_m = fd2_m + \mu_m \cdot S_m \qquad \text{Expression 7}$$

As is apparent from Expression 7, the correction image $f_m$ is obtained as the second image $fd2_m$ when the restoration strength adjusting coefficient $\mu_m$ is 0 and is obtained as the first image $fd1_m$ when the restoration strength adjusting coefficient $\mu_m$ is 1. Furthermore, when the restoration strength adjusting coefficient $\mu_m$ is within a range from 0 to 1, a restoration degree is continuously adjusted between the second image $fd2_m$ to the first image $fd1_m$.

Here, the restoration degree can be adjusted by adjusting a calculation amount (addition amount) of the restoration component information $S_m$. Note that the restoration strength adjusting coefficient $\mu_m$ may be a negative coefficient.

Since the restoration strength adjusting coefficient $\mu_m$ (hereinafter represented by $\mu$ where appropriate) is adjustable, the balance between the restoration degree and risk of generation of disadvantage can be adjusted so that the disadvantage caused by the image restoration is suppressed.

Furthermore, in the method of this embodiment, even when the restoration degree, that is, the restoration strength adjusting coefficient $\mu$ is changed, recalculation of the image restoration filter and a re-convolution process of the image with the image restoration filter are not required. Therefore, a load of the image process can be reduced.

Next, processes of the operations will be described in detail in an order of the flow described above.

Input Image $g_m$

The input image $g_m$ is the same as the input image described in the image obtaining operation of the first embodiment.

Image Restoration Process

The image restoration filter used in the image restoration process is the same as the image restoration filter described in the image restoration filter generation operation of the first embodiment.

Here, a characteristic of aberration correction of the image restoration filter in the image restoration process performed to obtain the first image $fd1_m$ has been described with reference to Expression 4 in the first embodiment. Since the correction is preferably performed such that phase components of a restoration image become zero, [rOTF] does not have a phase component.

First Image $fd1_m$

By performing the image restoration process using the image restoration filter for restoring amplitude components and phase components, the first image $fd1_m$ is obtained. In conventional image restoration, the first image $fd1_m$ is output as a restoration image (corrected image). When the first image $fd1_m$ satisfies required image quality, the first image $fd1_m$ can be used as a corrected image $f_m$. However, in the first image $fd1_m$, actually, noise may be amplified or ringing or a false color is included as described above. The noise can be suppressed by appropriately setting a restoration degree of the image restoration filter in advance. However, since it is difficult to assume amounts of generation of the ringing and the false color, the restoration image should be evaluated and the restoration degree should be adjusted again.

Figure 14:
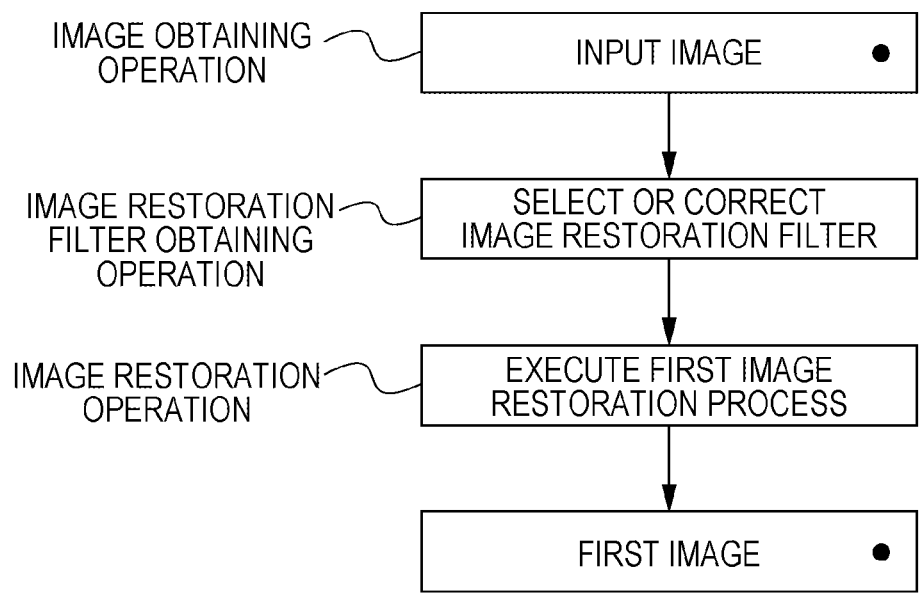
FIG. 14 is a flowchart illustrating a first image restoration process.

FIG. 14 is a flowchart illustrating an image process performed until the first image is obtained. Dots included in FIG. 14 represent operations of storing image data in a memory or the like. In an image obtaining operation, an input image is obtained. In an image restoration filter obtaining operation, an image restoration filter corresponding to an image pickup condition of the input image is selected or corrected to be obtained. In an image restoration process, an image restoration filter (first image restoration filter) which performs correction such that the phase components are corrected so that zero is obtained as a target value and the amplitude components are improved and corrected so that a difference between the amplitude components in azimuthal directions is reduced to address deterioration of the phase components and the amplitude components of the image in the first image restoration process described above is used. By performing the process described above, the first image $fd1_m$ in which aberration asymmetry is reduced can be obtained.

Second Image $fd2_m$

The second image $fd2_m$ is subjected to an image restoration process using an image restoration filter (second image restoration filter) having a restoration degree lower than that for the first image $fd1_m$. More preferably, restoration is performed such that, as with the first image $fd1_m$, amplitude characteristics in the azimuthal directions relatively coincide with each other. As shown in FIG. 8, for example, an asymmetry aberration of the second image $fd2_m$ can be corrected such that MTFs in the two azimuthal directions before restoration which are represented by the dotted line (a) and the solid line (b) coincide with each other as low restoration gains similarly to the dotted line (c) and the solid line (d) so that an asymmetry aberration can be corrected.

In this state, although azimuthal dependence of the phase components and the MTFs of the aberration are corrected, the MTFs themselves are low, that is, a sharpness degree is low. If the restoration degree of the first image $fd1_m$ and the restoration degree of the second image $fd2_m$ are different from each other but the asymmetry aberrations in the first image $fd1_m$ and the second image $fd2_m$ are corrected, a corrected image (adjusted restoration image) in which an asymmetry aberration is corrected is normally obtained even when the restoration degrees are changed.

Furthermore, the input image may be used as the second image $fd2_m$ without change. In this case, in a state in which the restoration strength adjusting coefficient $\mu$ is adjusted so that the lowest restoration degree is obtained, the input image can be obtained as the corrected image. Furthermore, as the restoration degree becomes higher, the MTFs and the sharpness are improved and a difference between the MTFs of the azimuthal directions is reduced. Therefore, a high-quality image in which the asymmetry aberration is corrected can be obtained. A flowchart of an operation of obtaining the second image $fd2_m$ is the same as that of FIG. 14 except that the restoration degree of the image restoration filter is different from that for the first image $fd1_m$, and therefore, a description thereof is omitted.

Restoration Component Information $S_m$

By subtracting the second image $fd2_m$ from the first image $fd1_m$ as represented by Expression 6 (by performing a subtracting process on individual color components and pixels), the restoration component information $S_m$ for individual color components can be generated. When correction is performed so that the phase components of the first image $fd1_m$ and the phase components of the second image $fd2_m$ which are deteriorated by the image pickup system (image pickup optical system) (deterioration of the phase components) are brought to coincide with each other, states of the phase components are substantially the same as each other but states of the amplitude components are different from each other. Accordingly, the restoration component information $S_m$ can be referred to as information on a difference between the amplitude components of the first image $fd1_m$ and the amplitude components of the second image $fd2_m$.

Here, the states of the phase components of the first image $fd1_m$ and the states of the phase components of the second image $fd2_m$ preferably coincide with each other in a state in which deterioration of the phase components due to the image pickup system is sufficiently removed. On the other hand, the states of the amplitude components should be different from each other in order to adjust a restoration degree using a restoration strength adjusting coordinate described below.

Therefore, the restoration component information $S_m$ includes aberration components other than phase shift of the second image $fd2_m$, components of increase of noise generated due to the image restoration process, ringing components, and false color components.

Restoration Strength Adjusting Coefficient $\mu_m$ and Corrected Image $f_m$

As described above, the restoration image obtained through the restoration process using the image restoration filter which reduces a difference between the MTFs of the azimuthal directions as described above has an improved asymmetry aberration. However, in general, an object has a depth, and when an aberration characteristic generated in an actual image pickup state and an aberration characteristic assumed by the image restoration filter are different from each other, an adverse effect including ringing may be generated in the restoration image as artifact.

Furthermore, when a restoration degree for two color components is different from assumed one, coloring is generated, that is, a false color may be generated in the restoration image. This false color is included in the artifact similarly to the noise and the ringing.

Figure 22:
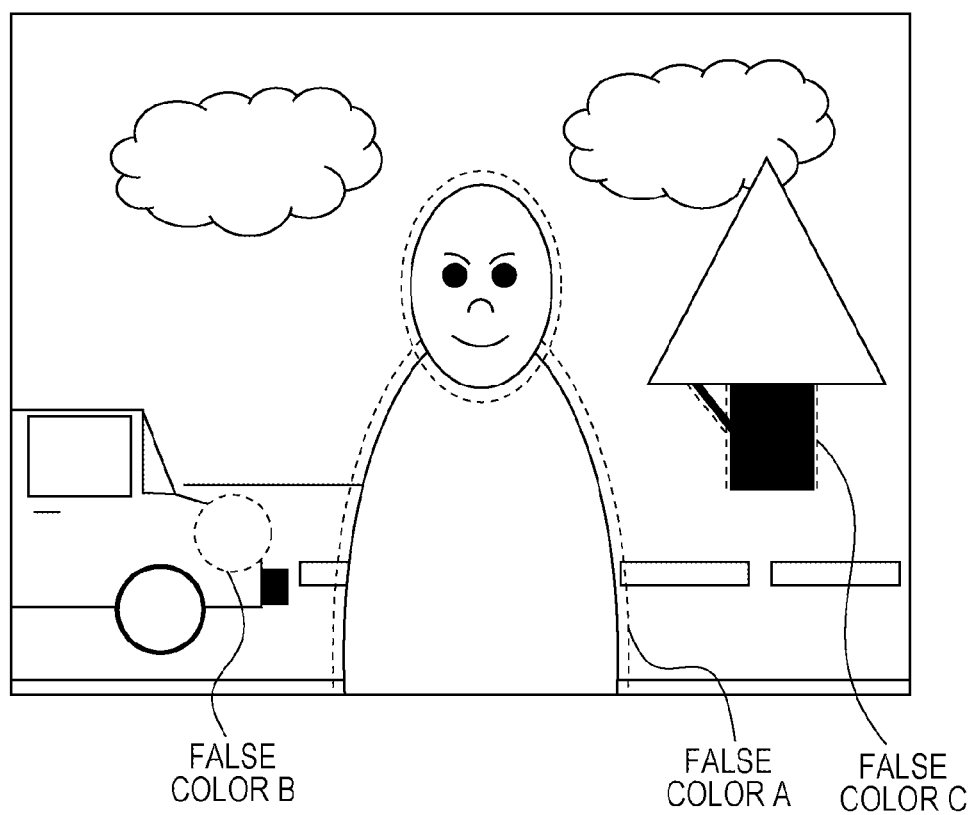
FIG. 22 is a diagram illustrating false colors.

FIG. 22 shows an example of false colors generated in a restoration image. The false colors are generated in regions defined by dotted lines in FIG. 22. A false color A is generated when an edge portion becomes a colored state when compared with the image before the restoration process. A false color B is generated when a surrounding portion of a luminance saturation portion becomes a colored state due to luminance saturation caused by strong reflection of sunlight when compared with the image before the restoration process. A false color C is generated when an edge portion becomes a colored state due to defocusing when compared with the image before the restoration process.

Therefore, the restoration strength adjusting coefficient $\mu$ capable of adjusting a restoration degree (restoration strength) is used. By this, the balance between a risk of generation of adverse effects such as coloring (false colors), noise, ringing, and the like and the restoration degree can be adjusted. As the example shown in FIG. 22, even when an aberration characteristic corresponding to a correction characteristic of the image restoration filter and an aberration characteristic of the image are different from each other, excellent image quality in which artifact including the false colors, ringing, and the like are prevented from being generated can be obtained. Hereinafter, the restoration strength adjusting coefficient $\mu$ will be described.

As represented by Expression 7, the corrected image $f_m$ is obtained by synthesizing the restoration component information $S_m$ with the second image $fd2_m$ for individual color components in accordance with the restoration strength adjusting coefficient $\mu_m$. The corrected image $f_m$ is obtained as the second image $fd2_m$ when the restoration strength adjusting coefficient $\mu_m$ is 0 and obtained as the first image $fd1_m$ when the restoration strength adjusting coefficient $\mu_m$ is 1. Furthermore, when the restoration strength adjusting coefficient $\mu_m$ is in a range from 0 to 1, the restoration degree can be continuously adjusted within a range from the second image $fd2_m$ to the first image $fd1_m$.

That is, aberration asymmetry is corrected and sharpness can be enhanced taking the adverse effects (false colors, ringing, and amplification of noise) caused by the image restoration process into consideration, and accordingly, an image having higher quality can be obtained.

Furthermore, an image having image quality desired by the user can be provided while increase of a processing load is suppressed.

The phase components and the aberration asymmetry of the second image $fd2_m$ and the phase components and the aberration asymmetry of the restoration component information $S_m$ are corrected and only the amplitude components (an amount of a blur) of the second image $fd2_m$ and the amplitude components of the restoration component information $S_m$ are different from each other. Therefore, the phase components and the aberration asymmetry are not changed in accordance with an adjusting amount of the restoration degree, and a state in which the aberration asymmetry is corrected can be maintained. Furthermore, although a basic range of the restoration strength adjusting coefficient $\mu$ is a range from 0 inclusive to 1 inclusive, when $\mu>1$ is satisfied, a corrected image which is emphasized can be obtained. That is, the restoration strength adjusting coefficient $\mu$ can be variably set.

Furthermore, when the restoration strength adjusting coefficient $\mu$ is changed for each color component, the restoration degree can be adjusted for each color component. This is effective for adjustment of restoration degrees for individual color components when optic transfer functions (OTFs) are changed for individual color components and the balance of the aberration asymmetry is changed due to spectroscopic variation of the light source of the object or manufacturing errors of the image pickup optical system. Change of a spectroscopic property of the light source means change of strength ratios of individual wavelengths. Therefore, aberration values are different depending on the color components. Accordingly, by setting restoration strength adjusting coefficients $\mu$ for individual color components in accordance with the spectroscopic characteristics at the time of image capturing, corrected images $f_m$ suitable for the color components can be obtained.

Furthermore, as an adverse effect generated when a manufacturing error occurs in the image pickup optical system, deterioration degrees of vertically-symmetric portions of the image may be different from each other, for example. The difference between the deterioration degrees appears as a difference between blur components or between relative coloring components. As for the blur components, when the restoration strength adjusting coefficients $\mu$ are set in accordance with change of blur amounts depending on a portion of the image, the manufacturing error can be absorbed. Furthermore, as for the coloring, when the restoration strength adjusting coefficients $\mu$ are set for individual color components in accordance with variation of blur amounts depending on a portion of the image, the manufacturing error can be absorbed.

Evaluation of image quality of the output image varies depending on a purpose. For example, in a case of portrait, noise and ringing are considerably unnecessary. On the other hand, when a license plate number is to be read using a surveillance camera, it is the most important to specify the number even when the noise and the ringing are included. Furthermore, when an adverse effect such as noise, ringing, or a false color clearly appears in the image due to some sort of factors, it is important to output an image in which the adverse effect is sufficiently avoided as an output image even if a restoration degree is low to obtain a reliable output image. The restoration strength adjusting coefficient μ is adjusted for addressing these cases.

Furthermore, also in general photography, different users or different objects require different levels of image quality of an output image in a range from an image including an aberration so that a soft effect is obtained due to generation of flare to an image having a sharp effect by removing an aberration. The restoration strength adjusting coefficient μ is also adjusted for addressing this case.

Furthermore, Expression 6 is altered such that the first image $fd1_m$ is subtracted from the second image $fd2_m$ to extract restoration component information. In this case, even when the restoration component information is subtracted from the second image $fd2_m$ in accordance with the restoration strength adjusting coefficient (this operation is also included in "synthesis") as a modification of Expression 6, equivalence is maintained in the formula, and therefore, the same effect is obtained.

Conventionally, a parameter used to generate an image restoration filter is required to be changed in order to change a restoration degree as described above, and therefore, the image restoration filter should be recalculated every time the restoration degree is changed. Furthermore, a convolution process is required to be performed on an input image using the recalculated image restoration filter. This is a major hurdle for performing a high speed image process.

However, in the image processing method of this embodiment, even when a restoration degree is adjusted, only a synthesis ratio of an image is changed, and therefore, an image restoration filter is not required to be recalculated. Furthermore, a convolution process is not required to be performed on an input image every time an adjusting parameter is changed. Moreover, since correction is performed so that a point symmetrical state is obtained even when a restoration degree is low or aberration asymmetry is small, a state in which asymmetry of a magnification aberration is removed is not changed and image deletion which is a characteristic of a comma aberration is corrected.

Figure 15:
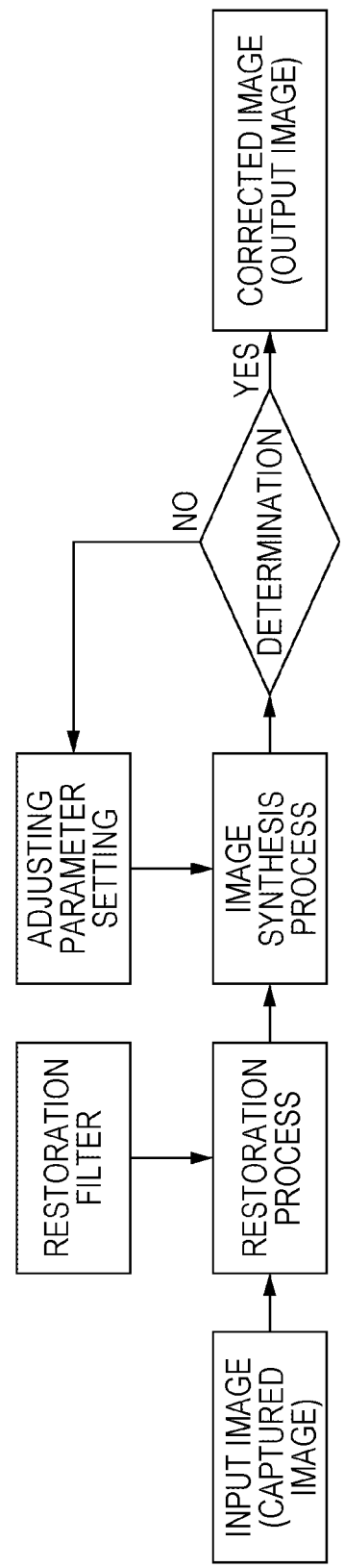
FIG. 15 is a flowchart illustrating setting of a adjusting parameter.
Figure 21:
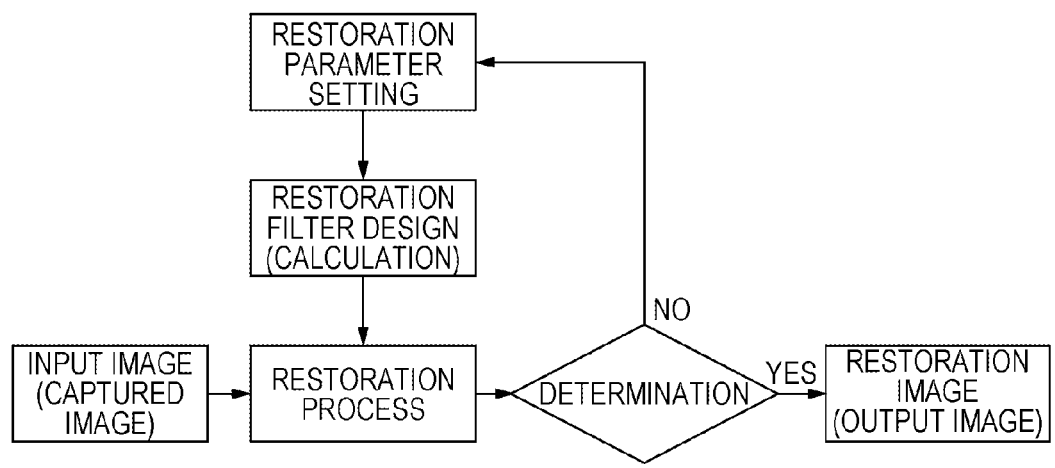
FIG. 21 is a flowchart illustrating a conventional image processing method.

The conventional image processing method and the image processing method of this embodiment will be compared with each other with reference to FIGS. 15 and 21. FIG. 21 is a flow of the conventional image processing method (image restoration process). A captured image is used as an input image, and an image restoration process is performed on the input image using an image restoration filter generated using a restoration parameter served as an initial value or an image restoration filter provided as an initial value in advance. It is determined whether an obtained restoration image is used as an output image or a restoration degree is changed again by evaluating the restoration image. When the restoration degree is changed, the restoration parameter is changed, the image restoration filter is recalculated, and the image restoration process is performed on the input image again. When a desired image is obtained by repeatedly performing this operation, the image is output as a restoration image (output image).

On the other hand, FIG. 15 is a flow of an image processing method (image restoration process) of this embodiment. A captured image is used as an input image, and an image restoration process is performed on the input image using an image restoration filter generated using a restoration parameter served as an initial value or an image restoration filter provided as an initial value in advance. An image synthesis process is performed on an obtained restoration image using an adjusting parameter provided in advance, an adjusting parameter set by the user, or an adjusting parameter automatically determined in accordance with image information so that an adjusted restoration image is obtained. It is determined whether the obtained adjusted restoration image is used as a corrected image (output image) without change or a restoration degree is changed again by evaluating the adjusted restoration image. When the restoration degree is changed, the adjusting parameter is changed and the image synthesis process is performed again. The adjusting parameter herein corresponds to the restoration strength adjusting coefficient μ described above.

As described above, the conventional image restoration process and the image restoration process in this embodiment are considerably different from each other in that recalculation of the image restoration filter at the time of adjustment is required in the conventional image restoration process and the convolution process of the input image with the image restoration filter which is included in the image restoration process is required in the conventional image restoration process. That is, since the recalculation of the image restoration filter and the re-convolution process of the image with the image restoration filter are not required to be performed when the restoration degree is changed, a load of the image process can be reduced and the process is performed at high speed.

Furthermore, the determination regarding application as the output image and a change of the adjusting parameter in accordance with the change of the restoration degree may be performed by the user on the basis of subjective evaluation or may be automatically performed by setting an image evaluation function in advance.

Furthermore, the adjusting parameter can be automatically changed in accordance with feature values of the pixels of the input image. The term "feature values of the pixels" represent partial contrast and luminance levels of the input image. As a method for detecting a level of partial contrast of an image, a method using a differential filter is known, for example. By using this, an edge portion can be separated from other portions in an image. Since sharpness of the edge portion affects sharpness of the entire image, an adjusting parameter is set such that a high restoration degree is attained in the edge portion. On the other hand, a high restoration degree assigned to the portions which are not the edge portion and which has comparatively a small range of shading levels does not affect the sharpness of the entire image but increased noise in this portions causes an adverse effect, and accordingly, the adjusting parameter is set so that the restoration degree becomes low.

Furthermore, since an SN ratio of an original image signal to a noise signal is low in a portion having a low luminance level, noise is easily noticeable when a restoration degree is high, and therefore, the adjusting parameter is set so that the restoration degree becomes low. On the other hand, in a portion corresponding to luminance saturation, an original image signal is clipped (limited) in an upper limit of a range of an image pickup element, and therefore, an aberration state is considerably different from an expected state. Accordingly, an adverse effect caused by an image restoration is likely to be generated. Therefore, the adverse effect can be avoided by setting an adjusting parameter such that a low restoration degree is obtained.

Furthermore, the restoration degree can be adjusted in accordance with a type of a recognized object. For example, in recent years, digital still cameras include a face recognition function. However, when artifact such as noise or a false color is generated on a face of a person due to an image restoration, considerably unnatural image is obtained. Therefore, it is preferable that a restoration degree is appropriately adjusted.

Furthermore, to change an adjusting parameter in accordance with feature values of pixels means to change an adjusting parameter in accordance with a position of an image. In this embodiment, since the image is subjected to synthesis in a unit of pixel in the image synthesis process, adjustment is comparatively easily performed merely by changing a mixture ratio in the synthesis. As described above, a fact that the restoration degree can be adjusted in a unit of pixel is included in characteristics of this embodiment.

A setting value of the adjusting parameter may be changed in accordance with an image pickup state such as an ISO sensitivity, a focal length (zoom position), an object distance (focusing distance), an aperture value, and the like.

Moreover, although the basic flow of the image processing method according to the present invention has been described, some operations among the operations described hereinabove may be collectively performed at the same time. Furthermore, a required processing operation may be added before or after each of the operations where appropriate. In addition, expressions, equal marks, and symbols used in the description do not limit a concrete algorithm of the image processing method of the present invention, and various modifications may be made where appropriate.

Figure 16:
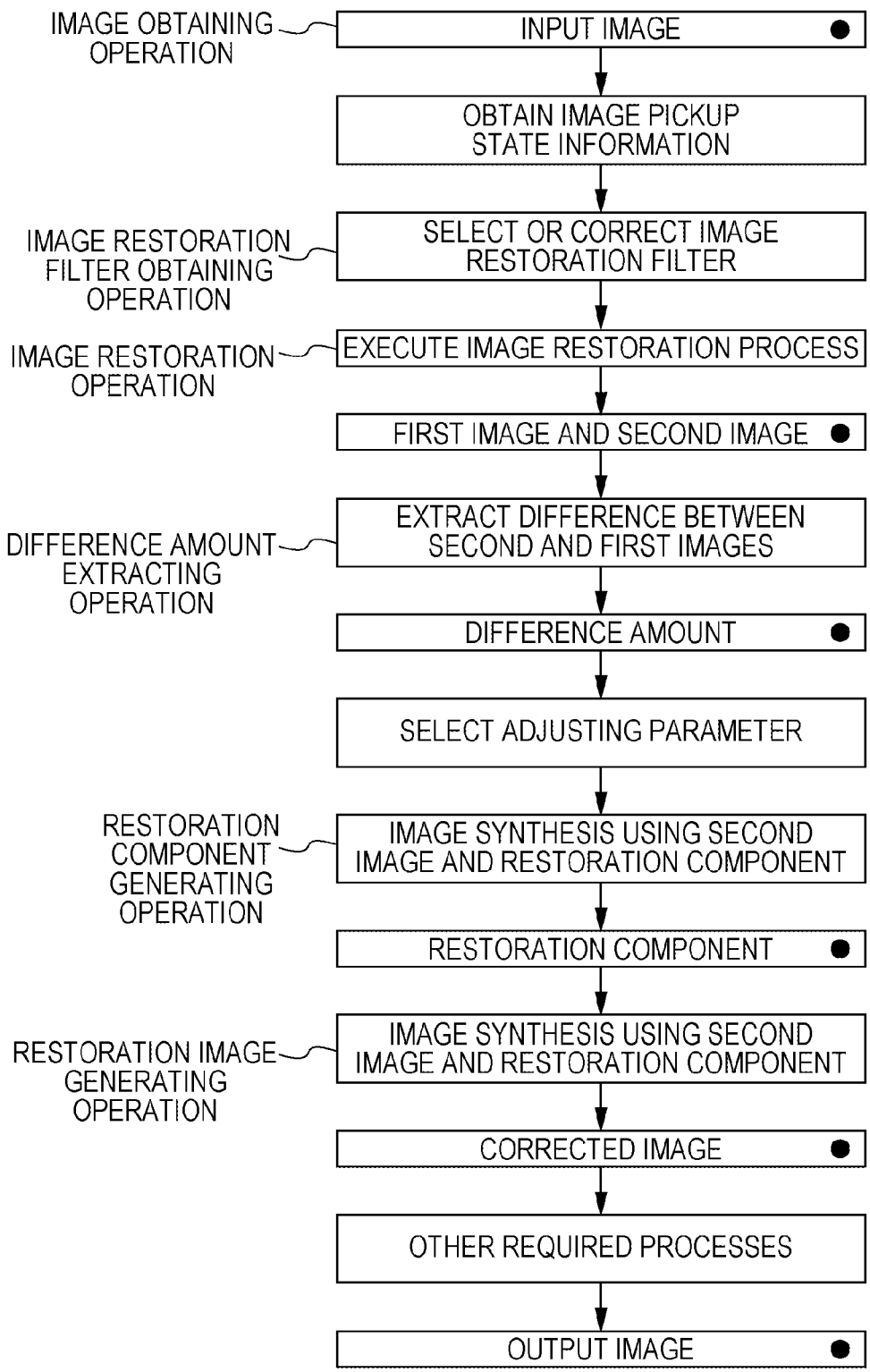
FIG. 16 is a flowchart illustrating the image process according to the third embodiment.

The image restoration process (image processing method) of this embodiment is executed by the image processing unit 104 shown in FIG. 5. FIG. 16 shows a flow regarding the image restoration process of this embodiment executed by the image processing unit 104 in detail. Dots included in FIG. 16 represent steps of at least temporarily storing pixel data of an image and the like.

The image processing unit 104 obtains an input image in an image obtaining operation (image obtaining step). Next, the image processing unit 104 obtains image pickup state information from the state detection unit 107 and selects an image restoration filter corresponding to an image pickup state from the storage unit 108. Then, in the image restoration operation (image restoration step), the image processing unit 104 performs a restoration process on the input image. In the image restoration operation, a first image is generated by correcting (restoring) amplitude components and phase components and a second image is generated by correcting (restoring) only the phase components.

In a restoration component information generation operation (restoration component information generation step), the image processing unit 104 generates restoration component information from differences between signal values of pixels included in the first image and signal values of pixels included in the second image. The restoration component information is information on a difference between the first and second images, and therefore, has a positive value or a negative value.

Then, in this restoration component information generation operation (difference information obtaining operation), the image processing unit 104 obtains a setting value of an adjusting parameter as a restoration strength adjusting coefficient µ. As a method for setting the adjusting parameter, one of setting values provided in advance in accordance with image pickup states or in accordance with a height of the image may be automatically selected. Furthermore, feature values of pixels included in an image are discriminated and the adjusting parameter which is automatically changed can be set. Alternatively, the user may arbitrarily set the setting value.

Next, in a restoration image generation operation (adjusted restoration image generation operation), the image processing unit 104 synthesizes the restoration component information with the second image in accordance with the adjusting parameter so as to generate a corrected image. Specifically, pixel values obtained by multiplying the pixel values of the restoration component information by the restoration strength adjusting coefficient µ are added to the second image for individual pixels to thereby obtain a corrected image (adjusted restoration image).

Next, the image processing unit 104 performs other processes required for image formation and outputs the restoration image (corrected image). Here, the term "other processes" includes a color interpolation process (demosaicing process) when the image subjected to the correction process is a mosaic image. In addition, an edge emphasis process, shading correction (peripheral light amount correction), distortion aberration correction, and the like are included. Furthermore, various image processes including the other processes described herein may be inserted before or after the flow or in the course of the flow.

Although the preferable anteroposterior relationships of the processing operations and considerable processes have been described hereinabove, an order of the processing operations is not limited to this and modifications may be made in accordance with a restriction condition of the process or required image quality. Furthermore, although the process of restoring only the phase components is performed in the correction process in this embodiment, the amplitude components may be changed to some extent when noise amplification is within an allowable range.

Fourth Embodiment

Figure 17:
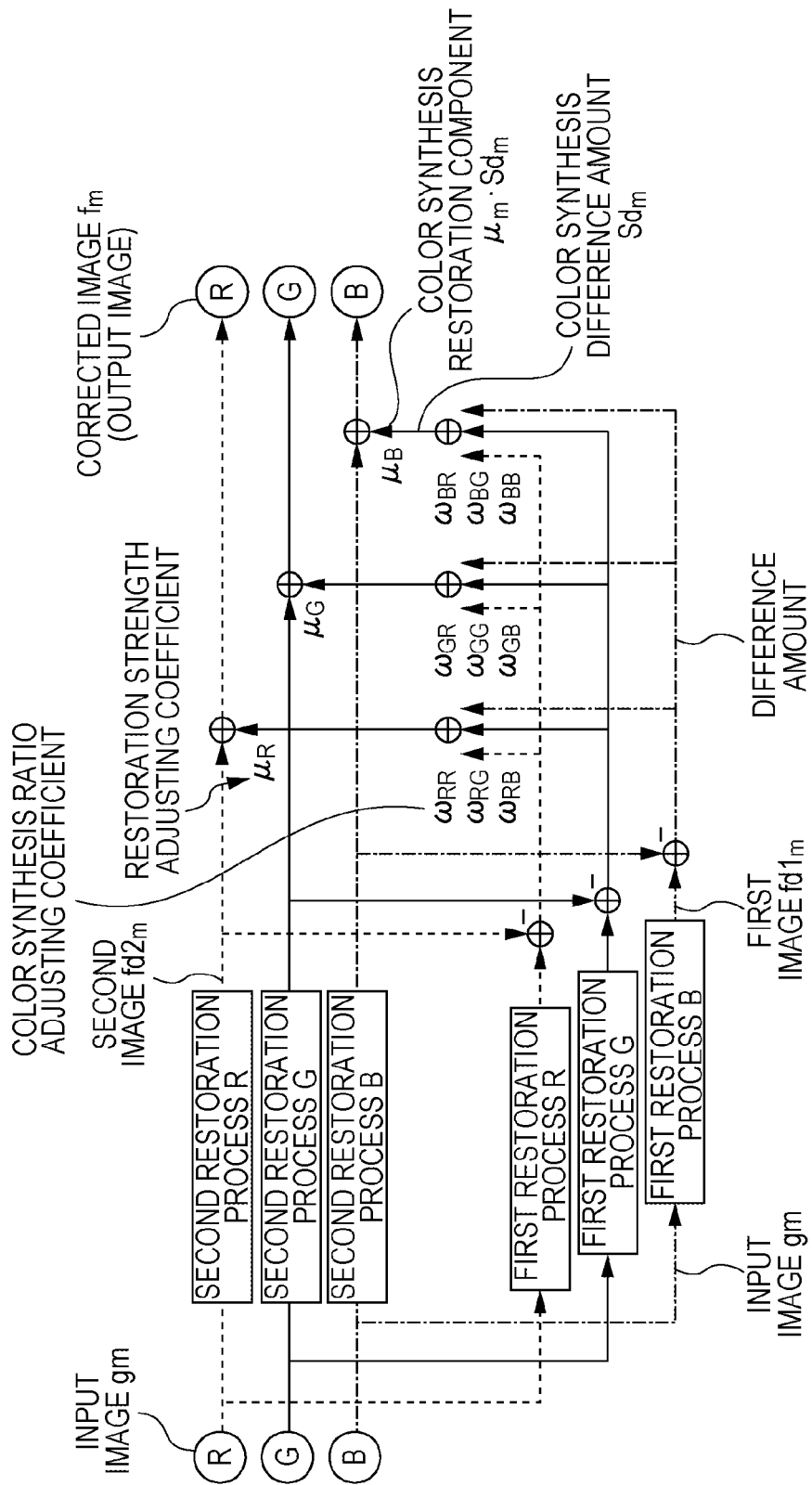
FIG. 17 is a diagram illustrating a procedure of an image restoration process according to a fourth embodiment.

In this embodiment, an image processing method for suppressing generation of a false color generated by an image restoration process will be described. FIG. 17 is a flow of a process of generating color synthesis restoration component information items $Sd_m$ for individual color component by performing color synthesis on restoration component information items $S_m$ for individual color component in accordance with a color synthesis ratio adjusting coefficient $\omega$ and synthesizing the color synthesis restoration component information items $Sd_m$ with a second image $S_m$.

The color synthesis ratio adjusting coefficient $\omega$ is used to generate the color synthesis restoration component information (difference information) items $Sd_m$ by performing color synthesis on the restoration component information (difference amount) items $S_m$ of all the color components in accordance with the color synthesis ratio adjusting coefficient $\omega$ for individual color components and serves as a mixture ratio of the color components. Therefore, a process of generating the color synthesis restoration component information items $Sd_m$ from the restoration component information $S_m$ can be represented by Expression 12 and Expression 13 obtained by developing Expression 12 for individual color components m and n.

$$Sd_m = \sum_n^{RGB} \omega_{mn} S_n \qquad \text{Expression 12}$$

$$\begin{pmatrix} Sd_R \\ Sd_G \\ Sd_B \end{pmatrix} = \begin{pmatrix} \omega_{RR} & \omega_{RG} & \omega_{RB} \\ \omega_{GR} & \omega_{GG} & \omega_{GB} \\ \omega_{BR} & \omega_{BG} & \omega_{BB} \end{pmatrix} \begin{pmatrix} S_R \\ S_G \\ S_B \end{pmatrix} \quad \text{Expression 13}$$

Next, a method for determining nine color synthesis ratio adjusting coefficients ω in Expression 13 will be described. First, two examples of a color synthesis ratio adjusting coefficient ω will be described.

A first example is a color synthesis ratio adjusting coefficient ω used to obtain an image which is the same as a first image $fd1_m$ and which serves as a corrected image when a restoration strength adjusting coefficient μ is set to 1. Assuming that a unit matrix in Expression 13 includes diagonal elements of the color synthesis ratio adjusting coefficient ω of 1 and other elements of 0, color synthesis restoration component information items $Sd_m$ equal to the restoration component information items $S_m$ of the corresponding color components. This is a coefficient setting employed when a corrected image $f_m$ is output as an image which is the same as the first image $fd1_m$. In this case, as described above, an aberration component of the corrected image is to be corrected at maximum, and simultaneously, a risk of generating a false color is high.

A second example is a color synthesis ratio adjusting coefficient ω used to suppress generation of false colors. Assuming that all elements of the color synthesis ratio adjusting coefficient ω of Expression 13 is 1/3, the color synthesis restoration component information items $Sd_m$ correspond to averages of the restoration component information items $S_m$ of all the color components and the color restoration component information $Sd_R$, $Sd_G$, and $Sd_B$ are the same as one another. When the color synthesis restoration component information items $Sd_m$ are the same as one another for all the color components, additional information items regarding the color components are not different from one another at a time when a second image $fd2_m$ is synthesized with the color synthesis restoration component information items $Sd_m$ in a subsequent operation. Therefore, a false color is not generated.

Note that, since the aberration information items of the color components are averaged, the restoration degree, that is, sharpness is deteriorated when compared with a case where the first image $fd1_m$ is used as the output image in the first example. However, since the restoration component information items $S_R$, $S_G$, $S_E$, of the color components are positively correlated (similarity) with one another more than a little even when the restoration component information items $S_m$ are averaged, the sharpness of the corrected image corresponding to the input image $g_m$ is improved. Accordingly, this serves as a restoration condition for removing the risk of generation of false colors.

The settings of the color synthesis ratio adjusting coefficient ω at a time of the maximum risk of generation of false colors and at a time of the minimum risk of generation of false colors have been described above. By continuously changing the color synthesis ratio adjusting coefficient ω, the balance between the risk of generation of false colors and the restoration degree can be continuously adjusted.

An example of a method for determining an intermediate color synthesis ratio adjusting coefficient ω in a case other than the case where the color synthesis ratio adjusting coefficient ω in Expression 13 is used as a unit matrix and the case where all the elements of the color synthesis ratio adjusting coefficient ω are 1/3 will be described hereinafter. Since the color synthesis ratio adjusting coefficient ω has nine setting degrees of freedom, setting of values of the elements is difficult in some cases. The color synthesis ratio adjusting coefficient ω is variably settable, and for example, a general user can variably set the color synthesis ratio adjusting coefficient ω in an image pickup device or an image processing system.

To address this difficulty, dependency is assigned to the elements of the color synthesis ratio adjusting coefficient ω so that the degree of freedom to be adjusted is reduced. However, the dependency should be the relationship which can be used to adjust the balance between the restoration degree and the risk of generation of false colors. Furthermore, if the adjusting parameter can be appropriately adjusted with the small degree of freedom, operation efficiency in a device development operation and a production operation is improved for providers of the image pickup device and the image processing system.

As an example of the method for determining the color synthesis ratio adjusting coefficient ω, first, two restriction conditions are provided. As a first restriction condition, sums for individual rows included in the matrix ω of Expression 13 are set to 1 as shown in Expression 14. This means normalization of a mixture ratio of the restoration component information items $S_R$, $S_G$, and $S_E$, used to generate color synthesis restoration component information $Sd_R$ of the R component, for example. By normalizing mixture ratios as described above, ratios of weights of the color synthesis restoration component information items $Sd_m$ can be easily compared with each other.

$$\sum_{n}^{RGB} \omega_{mn} = 1 \quad \text{Expression 14}$$

As a second restriction condition, sums for individual columns included in the matrix ω of Expression 13 are set to 1 as shown in Expression 15. This means that, when the color synthesis restoration component information items $Sd_R$, $Sd_G$, and $Sd_B$ are generated, the restoration component information items $S_R$, $S_G$, and $S_B$ are assigned to the corresponding color components and used up.

$$\sum_{m}^{RGB} \omega_{mn} = 1 \quad \text{Expression 15}$$

When the two restriction conditions described above are provided, the color synthesis ratio adjusting coefficient ω can be represented by Expression 16.

$$\omega = \begin{pmatrix} \omega_{RR} & 1-\omega_{GG}-\omega_{BG} & \omega_{RB} \\ \omega_{GR} & \omega_{GG} & 1-\omega_{BB}-\omega_{RB} \\ 1-\omega_{RR}-\omega_{GR} & \omega_{BG} & \omega_{BB} \end{pmatrix} \quad \text{Expression 16}$$

Furthermore, since an object of this embodiment is to suppress the risk of generation of false colors while the restoration degree is maintained, the color synthesis restoration component information items $Sd_m$ are preferably similarly to one another among the color components, that is, a difference among the color synthesis restoration component information items $Sd_m$ is preferably small. In the description in the case where ω is equal to 1/3, since the color components of the color synthesis restoration component information items $Sd_m$ are not different from one another, the minimum risk of generation of false colors is obtained, that is, a false color is not generated. Accordingly, since a restoration component information $S_m$ of a certain color component should be assigned to the color synthesis restoration component information items $Sd_m$ of the color components as uniform as possible, smaller dispersion of the columns in Expression 16 can reduce the risk of generation of false colors.

When the dispersion of the columns of Expression 16 is minimized in accordance with this, Expression 17 is obtained. Since Expression 17 includes a single setting parameter ω, the balance between the restoration degree and the risk of generation of false colors can be easily adjusted.

$$\omega = \begin{pmatrix} \omega & (1-\omega)/2 & (1-\omega)/2 \\ (1-\omega)/2 & \omega & (1-\omega)/2 \\ (1-\omega)/2 & (1-\omega)/2 & \omega \end{pmatrix} \quad \text{Expression 17}$$

Assuming that ω is equal to 1 in Expression 17, the matrix ω is a unit matrix and the maximum restoration degree and the maximum risk of generation of false colors are obtained. Furthermore, assuming that ω is equal to 1/3, all the elements of the matrix ω become 1/3, and the restoration degree is lowered and the risk of generation of false colors reduces. Accordingly, adjustment for reducing the risk of generation of false colors can be performed by reducing the color synthesis ratio adjusting coefficient ω in a range from 1/3 inclusive to 1 inclusive.

Here, although an example of the method for determining the color synthesis ratio adjusting coefficient ω has been described, the determination method is not limited to this. For example, when all the elements included in the matrix ω is 0 (zero), the color synthesis restoration component information items $Sd_m$ of all the color components are 0 (zero). Accordingly, the corrected image $f_m$ corresponds to the second image $fd2_m$. By this, by adjusting the color synthesis ratio adjusting coefficient ω in a range from 0 inclusive to 1 inclusive, the output image to be obtained can be adjusted in a range from the second image $fd2_m$ in which only the phase components are restored to the first image $fd1_m$ in which the amplitude components and the phase components are restored. Furthermore, by setting a number larger than 1 in Expression 14, the correction can be further emphasized.

As described above, the setting degree of freedom of the elements of the matrix ω is not limited to one, but the nine degrees of freedom or a degree of freedom reduced in accordance with another restriction condition can be used for the adjustment. For example, according to Expression 16, a degree of freedom is set to 6.

Furthermore, a range of the color synthesis ratio adjusting coefficient ω is also not limited to the range from 1/3 inclusive to 1 inclusive as in the case where the input image or the emphasized image is obtained as the corrected image $f_m$. That is, Expression 17 is merely an example in which the restoration degree and the risk of generation of false colors are easily determined using the single setting parameter ω. The essence of this embodiment is to suppress occurrence of the risk of generation of false colors by synthesizing the restoration component information items $S_m$ of the color components with one another and adjusting similarity of the color synthesis restoration component information items $Sd_m$ of the color components.

Furthermore, as represented by Expression 18, the color synthesis ratio adjusting coefficient ω and the restoration component adjusting coefficient μ may be combined with each other and used for adjustment. When the color synthesis ratio adjusting coefficient w and the restoration component adjusting coefficient m with each other, the color synthesis ratio adjusting coefficient ω in a range from 1/3 inclusive to 1 inclusive suppresses generation of false colors and the restoration component adjusting coefficient μ in a range from 0 inclusive to 1 inclusive can adjust a restoration degree.

$$f_m = g_m + \mu_m Sd_m \quad \text{Expression 18}$$
$$= g_m + \mu_m \sum_n^{RGB} \omega_{mn}(fd_n - g_n)$$

A restoration component adjusting coefficient μ may be common in the color components as represented by Expression 19.

$$f_m = g_m + \mu Sd_m \quad \text{Expression 19}$$
$$= g_m + \mu \sum_n^{RGB} \omega_{mn}(fd_n - g_n)$$

Furthermore, when the restoration component information items $S_m$ of the color components are subjected to color synthesis as described above, each of the pixels has a plurality of color component information items. Therefore, when the image restoration process is performed on a mosaic image including pixels each of which has a single color component information item, a color interpolation process (demosaicing process) should be performed before the color synthesis process is performed. Therefore, restoration component information items $S_m$ in which each of pixels has a plurality of color component information items are generated by performing the color interpolation process on the restoration component information items of the color components or by performing the color interpolation process on the first and second images $fd1_m$ and $fd2_m$.

As described above, by using the color synthesis ratio adjusting coefficient ω, aberration asymmetry is corrected while the risk of generation of false colors caused due to the image restoration process can be reduced. Accordingly, an image having higher quality can be obtained.

Note that when the restoration degree is adjusted using the restoration component information of the third embodiment or the fourth embodiment, information described below may be added to the correction information shown in the drawing and stored in a storage unit. Alternatively, the information described below may be stored in the storage unit instead. Moreover, all correction information items do not have to be stored in the storage unit, and required information is written to and read from the storage unit where appropriate in accordance with configuration of the device and the system which performs the image restoration process.

Image Restoration Filter Group

The image restoration filter group is a set of image restoration filters used for the image restoration process. When the device which performs the image restoration process does not include any image restoration filter, an image restoration filter should be transmitted from another device (apparatus).

Restoration Component Information

In a case where the image restoration process has been performed and restoration component information has been generated, when a second image in which phases are corrected and the restoration component information are transmitted to another device, a restoration degree adjusting process can be performed in the device.

Adjusting Parameter Group

The adjusting parameter group is a set of the color synthesis ratio adjusting coefficient ω and the restoration strength adjusting coefficient μ. The color synthesis ratio adjusting coefficient ω and the restoration strength adjusting coefficient μ are changeable in accordance with positions on an image as described above. Furthermore, they can be changed in accordance with an image pickup state. Examples of data of the adjusting parameter group include table data of an adjusting coefficient itself and a function for determining an adjusting coefficient.

User Setting Information

The user setting information is an adjusting parameter used to adjust a restoration degree so that a restoration degree desired by the user is obtained or a correction function of the adjusting parameter. The user can set a variable adjusting parameter. However, when user setting information is used, an output image desired by the user can be normally obtained as an initial value. Furthermore, the user setting information is preferably updated using a learning function with reference to a history of determination of the adjusting parameter performed by the user so that the most desired sharpness degree is obtained.

Furthermore, preset values corresponding to some sharpness patterns may be provided by a provider (manufacturer) of the image pickup device through a network.

The correction information set described above is preferably attached to each image data. When required correction information is attached to image data, the image restoration process and the restoration degree adjusting process can be performed by any device or apparatus which incorporates the image processing device. Furthermore, content of the correction information set can be automatically or manually obtained or discarded where appropriate. For example, in a case where the restoration degree adjusting process is performed using another device, when the second image and the restoration component information are included in the correction information set, the image restoration filter group is basically not required.

The embodiments described above are merely representative examples, and various modifications and alterations of the embodiments may be made when the present invention is carried out.

The present invention is not limited to the foregoing embodiments, and various alterations and modifications may be made without departing from the spirit and the scope of the present invention. Accordingly, in order to publicize the scope of the present invention, the following claims are attached.

An effect of the present invention is to generate a highly precise restoration image in which an asymmetry aberration is reduced.

The invention claimed is:

1. An image processing device comprising:
image obtaining means configured to obtain an input image; and
image restoration means configured to restore the input image using a generated or selected image restoration filter in accordance with a transfer function of an image pickup system used to generate the input image,
wherein the image restoration filter is a filter which makes a difference between absolute values of transfer functions in two azimuthal directions obtained when a restoration image is obtained from an object smaller than a difference between absolute values of transfer functions of the two azimuthal directions of the image pickup system.

2. The image processing device according to claim 1, wherein the image restoration means is configured to perform image restoration by convolving the image restoration filter with pixels of the obtained input image.

3. The image processing device according to claim 1, wherein the image restoration filter is generated in accordance with transfer functions having different frequency characteristics in the two azimuthal directions and a correction transfer function which is corrected such that a difference between absolute values of the transfer functions having the different frequency characteristics in the two azimuthal directions is reduced.

4. An image pickup device comprising:
an image pickup element which performs photoelectric conversion on an object image formed by an image pickup system so as to generate a captured image; and
an image processing device which processes the captured image as an input image, the image processing device comprising:
image obtaining means configured to obtain the input image; and
image restoration means configured to restore the input image using a generated or selected image restoration filter in accordance with a transfer function of the image pickup system,
wherein the image restoration filter is a filter which makes a difference between absolute values of transfer functions in two azimuthal directions obtained when a restoration image is obtained from an object smaller than a difference between absolute values of transfer functions of the two azimuthal directions of the image pickup system.

5. An image processing method comprising:
a step of obtaining an image generated by an image pickup system as an input image; and
a step of restoring the input image using an image restoration filter generated or selected in accordance with a transfer function of the image pickup system and generating a restoration image,
wherein the image restoration filter is a filter which makes a difference between absolute values of transfer functions of two azimuthal directions obtained when the restoration image is obtained from an object smaller than a difference between absolute values of transfer functions of the two azimuthal directions of the image pickup system.

6. A non-transitory computer-readable medium having instructions that, when executed by a processor, cause the processor to perform operations comprising:
obtaining an image generated by an image pickup system as an input image; and
restoring the input image using an image restoration filter generated or selected in accordance with a transfer function of the image pickup system and generating a restoration image,
wherein the image restoration filter is a filter makes a difference between absolute values of transfer functions of two azimuthal directions obtained when the restoration image is obtained from an object smaller than a difference between absolute values of transfer functions of the two azimuthal directions of the image pickup system.

7. An image processing device comprising:
first restoration image generation means configured to generate a first restoration image by restoring an input image using a first image restoration filter obtained in accordance with a transfer function of an image pickup system which generates an object image as the input image;
difference information obtaining means configured to obtain information on an image difference between the input image and the first restoration image; and
adjusted restoration image generation means configured to generate an adjusted restoration image by synthesizing the input image with the information on the image difference in accordance with an adjusting coefficient,
wherein the first image restoration filter performs restoration such that a difference between absolute values of transfer functions in two azimuthal directions obtained when a restoration image is obtained from an object becomes smaller than a difference between absolute values of transfer functions of the two azimuthal directions of the image pickup system.

8. An image processing device comprising:
difference information obtaining means configured to obtain information on an image difference between
a first restoration image generated by restoring an input image using a first image restoration filter obtained in accordance with a transfer function of an image pickup system which generates an object image as the input image and
a second restoration image generated by restoring the input image using a second image restoration filter obtained in accordance with the transfer function of the image pickup system; and
adjusted restoration image generation means configured to generate an adjusted restoration image by synthesizing the input image with the information on the image difference in accordance with an adjusting coefficient,
wherein the first image restoration filter performs restoration such that a difference between absolute values of transfer functions in two azimuthal directions obtained when a restoration image is obtained from an object becomes smaller than a difference between absolute values of transfer functions of the two azimuthal directions of the image pickup system,
the second image restoration filter performs restoration such that a difference between absolute values of transfer functions in two azimuthal directions obtained when a restoration image is obtained from an object becomes smaller than a difference between absolute values of transfer functions in the two azimuthal directions of the image pickup system, and
a restoration degree of the second restoration image is lower than a restoration degree of the first restoration image.

9. The image processing device according to claim 7, wherein the first image restoration filter is generated in accordance with transfer functions having different frequency characteristics in the two azimuthal directions and correction transfer functions corrected such that a difference between absolute values of the transfer functions in the two azimuthal directions is reduced.

10. The image processing device according to claim 7, wherein the adjusted restoration image generation means performs restoration such that a difference between amplitude components of transfer functions in two azimuthal directions in a system including the image pickup system and the first image restoration filter becomes smaller than a difference between amplitude components of transfer functions in the two azimuthal directions of the image pickup system.

11. The image processing device according to claim 7, wherein the adjusting coefficient is a restoration strength adjusting coefficient which adjusts a calculation amount of the input image relative to the first restoration image.

12. The image processing device according to claim 11,
wherein the information on the image difference is obtained by synthesizing difference amounts of individual color components of the first restoration image and those of the input image in accordance with color synthesis ratio adjusting coefficients representing mixture ratios of the individual color components, and
the restoration strength adjusting coefficients are set for the individual color components.

13. The image processing device according to claim 8, wherein the adjusting coefficient is a restoration strength adjusting coefficient which adjusts a calculation amount of the second restoration image relative to the first restoration image.

14. The image processing device according to claim 13,
wherein the information on the image difference is obtained by synthesizing difference amounts of individual color components of the first restoration image and those of the second restoration image in accordance with color synthesis ratio adjusting coefficients representing mixture ratios of the individual color components, and
the restoration strength adjusting coefficients are set for the individual color components.

15. The image processing device according to claim 7, wherein a captured image is processed as the input image.

16. A computer-readable medium having instructions that, when executed by a processor, cause the processor to perform operations comprising:
obtaining information on an image difference between a first restoration image generated by restoring an input image using a first image restoration filter obtained in accordance with a transfer function of an image pickup system which generates an object image as the input image; and
generating an adjusted restoration image by synthesizing the input image with the information on the image difference in accordance with an adjusting coefficient,
wherein the first image restoration filter performs restoration such that a difference between absolute values of transfer functions in two azimuthal directions obtained when a restoration image is obtained from an object becomes smaller than a difference between absolute values of transfer functions of the two azimuthal directions of the image pickup system.

17. A computer-readable medium having instructions that, when executed by a processor, cause the processor to perform operations comprising:
obtaining information on an image difference between
a first restoration image generated by restoring an input image using a first image restoration filter obtained in accordance with a transfer function of an image pickup system which obtains an object image as the input image and
a second restoration image generated by restoring the input image using a second image restoration filter obtained in accordance with the transfer function of the image pickup system; and
generating an adjusted restoration image by synthesizing the input image with the information on the image difference in accordance with an adjusting coefficient, wherein the first image restoration filter performs restoration such that a difference between absolute values of transfer functions in two azimuthal directions obtained when a restoration image is obtained from an object becomes smaller than a difference between absolute values of transfer functions of the two azimuthal directions of the image pickup system, the second image restoration filter performs restoration such that a difference between absolute values of transfer functions in two azimuthal directions at a time of obtainment of a restoration image from an object is smaller than a difference between absolute values of transfer functions of the two azimuthal directions of the image pickup system, and a restoration degree of the second restoration image is lower than a restoration degree of the first restoration image.

18. An image processing method comprising:

a step of obtaining an input image;

a step of obtaining information on an image difference between the input image and a first restoration image generated using the input image and a first image restoration filter obtained in accordance with a transfer function of an image pickup system used to obtain the input image; and a step of generating an adjusted restoration image by synthesizing the input image with the information on the image difference in accordance with an adjusting coefficient, wherein the first restoration filter performs restoration such that a difference between absolute values of transfer functions in two azimuthal directions obtained when a restoration image is obtained from an object becomes smaller than a difference between absolute values of transfer functions in the two azimuthal directions of the image pickup system.

19. An image processing method comprising:

a step of obtaining an input image;

a step of obtaining information on an image difference between a first restoration image generated by restoring the input image using a first image restoration filter obtained in accordance with a transfer function of an image pickup system used to obtain the input image and a second restoration image generated by restoring the input image using a second image restoration filter obtained in accordance with a transfer function of the image pickup system;

a step of generating an adjusted restoration image by synthesizing the input image with the information on the image difference in accordance with an adjusting coefficient, wherein the first image restoration filter performs restoration such that a difference between absolute values of transfer functions in two azimuthal directions obtained when a restoration image is obtained from an object becomes smaller than a difference between absolute values of transfer functions of the two azimuthal directions of the image pickup system, the second image restoration filter performs restoration such that a difference between absolute values of transfer functions in two azimuthal directions obtained when a restoration image is obtained from an object becomes smaller than a difference between absolute values of transfer functions of the two azimuthal directions of the image pickup system, and a restoration degree of the second restoration image is lower than a restoration degree of the first restoration image.

* * * * *